United States Patent
Nagaike

(10) Patent No.: US 9,420,120 B2
(45) Date of Patent: Aug. 16, 2016

(54) APPARATUS, CONTROL METHOD AND PROGRAM THEREOF, AND EXTERNAL APPARATUS

(71) Applicant: CANON KABUSHIKI KAISHA, Tokyo (JP)

(72) Inventor: Ryuuji Nagaike, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 60 days.

(21) Appl. No.: 14/461,204

(22) Filed: Aug. 15, 2014

(65) Prior Publication Data

US 2015/0054967 A1    Feb. 26, 2015

(30) Foreign Application Priority Data

Aug. 21, 2013  (JP) .................................. 2013-171645

(51) Int. Cl.
*H04N 5/232* (2006.01)
*H04N 1/00* (2006.01)
*H04N 7/18* (2006.01)

(52) U.S. Cl.
CPC ....... *H04N 1/00129* (2013.01); *H04N 1/00209* (2013.01); *H04N 5/23206* (2013.01); *H04N 5/23229* (2013.01); *H04N 7/18* (2013.01)

(58) Field of Classification Search
CPC . H04N 1/00129; H04N 5/23206; H04N 7/18; H04N 5/23229; H04N 1/00209
USPC .................. 725/105; 348/14.05, 180, 211.8, 348/211.13, 333.01, 569, E13.058, E3.04
See application file for complete search history.

(56) References Cited

U.S. PATENT DOCUMENTS

| | | | |
|---|---|---|---|
| 2005/0012761 A1* | 1/2005 | Shiomi | G06T 3/40 345/660 |
| 2005/0271072 A1* | 12/2005 | Anderson | H04L 12/6418 370/419 |
| 2013/0182072 A1* | 7/2013 | Seo | H04N 13/004 348/43 |
| 2014/0071161 A1* | 3/2014 | Joseph | G06F 9/4445 345/629 |
| 2015/0281765 A1* | 10/2015 | Lee | H04N 21/4316 725/32 |

FOREIGN PATENT DOCUMENTS

JP    9-163258 A    6/1997
JP    11-146275 A   5/1999

* cited by examiner

*Primary Examiner* — Hung Lam
(74) *Attorney, Agent, or Firm* — Canon USA, Inc. IP Division

(57) ABSTRACT

A monitoring camera can make communication with a client apparatus through an IP network. The monitoring camera includes an image capturing unit that captures an image of an object, a compressing and encoding unit that overlays overlay information on the captured image, and a communication unit that transmits transparency information indicative of whether or not a transparency can be set for each of a first portion and a second portion of the overlay information, which is overlaid by the compressing and encoding unit, to the client apparatus via the IP network.

24 Claims, 18 Drawing Sheets

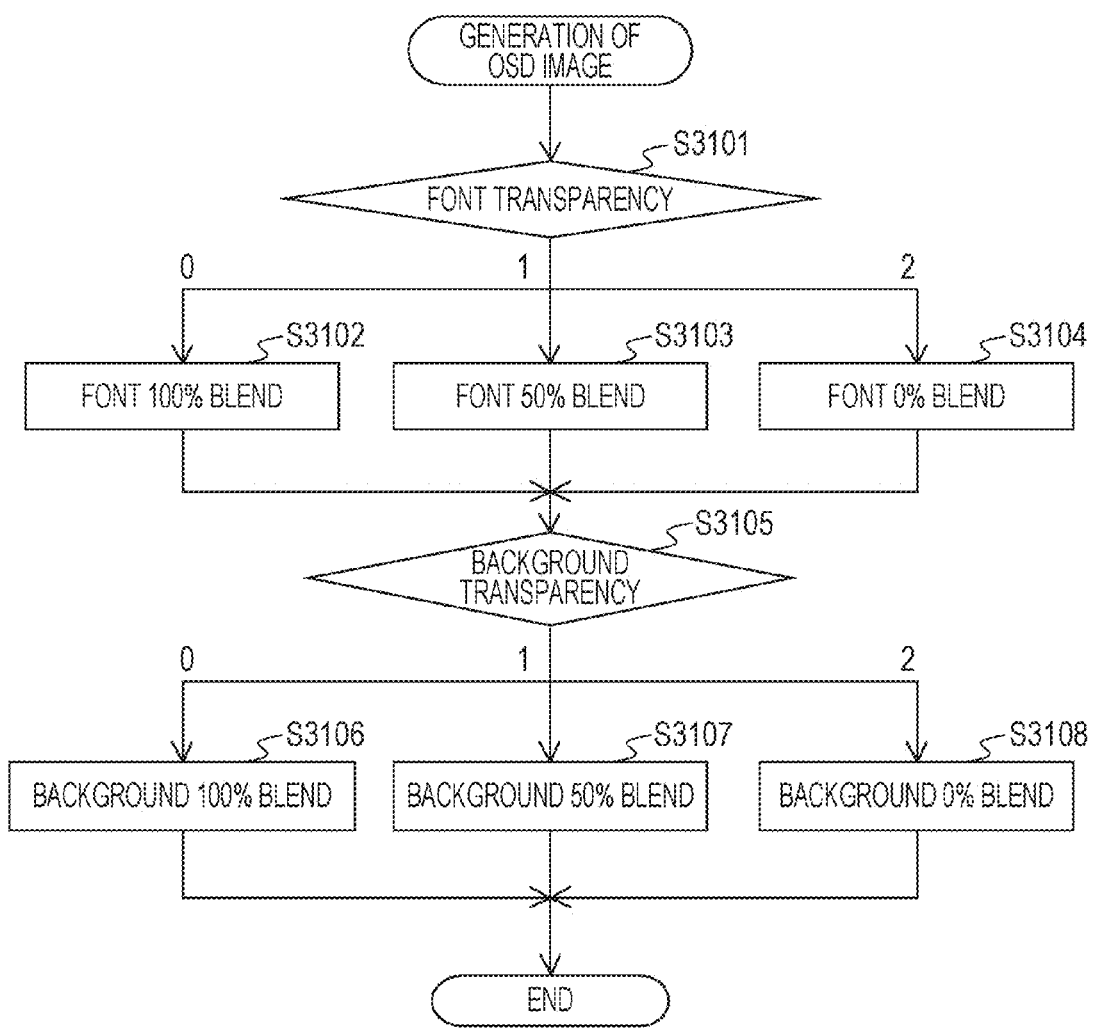

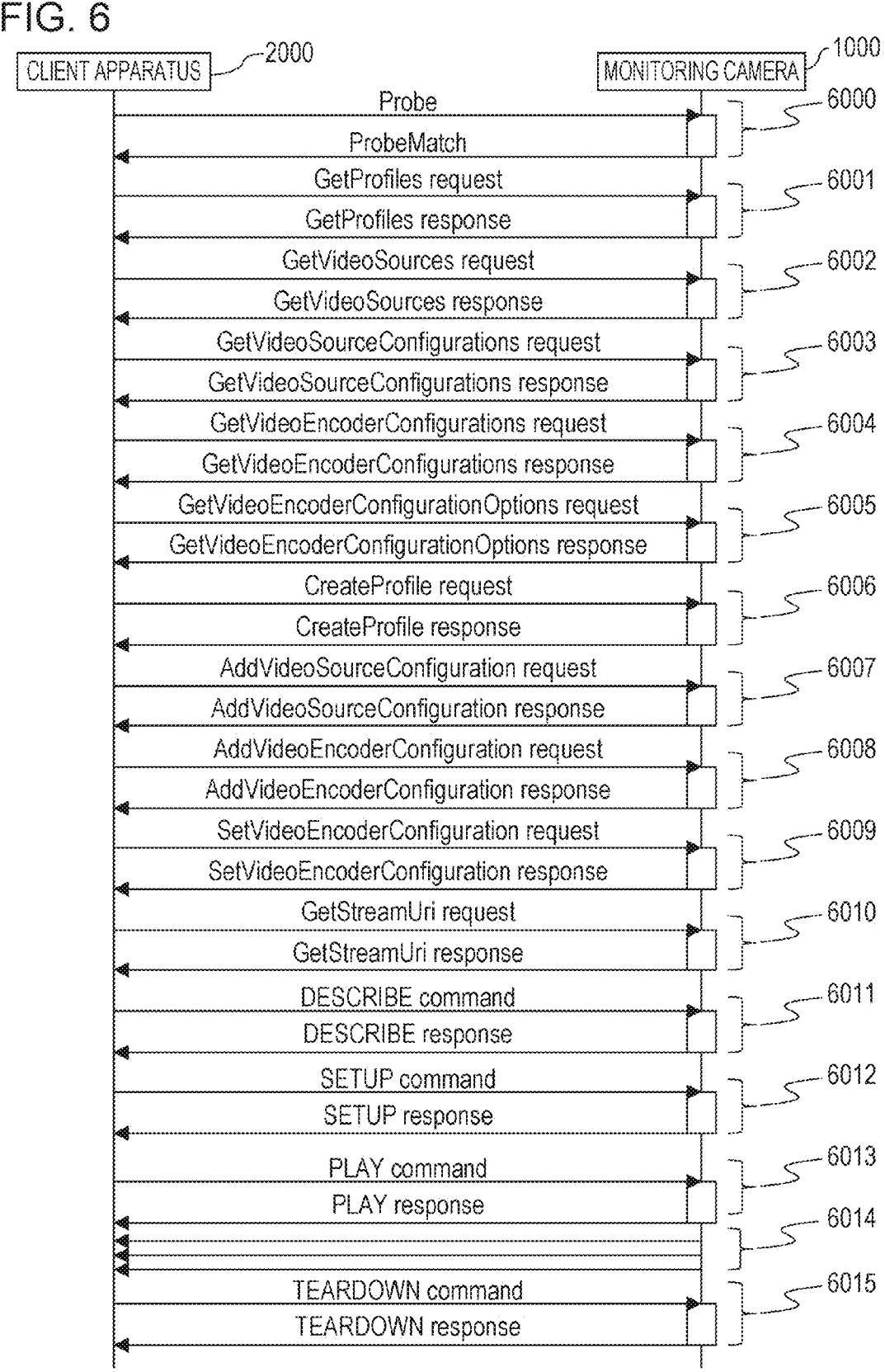

FIG. 8A

```
<xs:complexType name="OSDConfiguration">
  <xs:complexContent>
    <xs:extension base="tt:DeviceEntity">
      <xs:sequence>
        <xs:element name="VideoSourceConfigurationToken" type="tt:OSDReference"/>
        <xs:element name="Type" type="tt:OSDType"/>
        <xs:element name="Position" type="tt:OSDPosConfiguration"/>
        <xs:element name="TextString" type="tt:OSDTextConfiguration" minOccurs="0"/>
        <xs:element name="Image" type="tt:OSDImgConfiguration" minOccurs="0"/>
        <xs:element name="Extension" type="tt:OSDConfigurationExtension" minOccurs="0"/>
      </xs:sequence>
      <xs:anyAttribute processContents="lax"/>
    </xs:extension>
  </xs:complexContent>
</xs:complexType>
```

FIG. 8B

```
<xs:complexType name="OSDReference">
  <xs:simpleContent>
    <xs:extension base="tt:ReferenceToken">
      <xs:anyAttribute processContents="lax"/>
    </xs:extension>
  </xs:simpleContent>
</xs:complexType>
```

FIG. 8C

```
<xs:simpleType name="OSDType">
  <xs:restriction base="xs:string">
    <xs:enumeration value="Text"/>
    <xs:enumeration value="Image"/>
    <xs:enumeration value="Extended"/>
  </xs:restriction>
</xs:simpleType>
```

FIG. 8D

```
<xs:complexType name="OSDPosConfiguration">
  <xs:sequence>
    <xs:element name="Type" type="xs:string"/>
    <xs:element name="Pos" type="tt:Vector" minOccurs="0"/>
    <xs:element name="Extension" type="tt:OSDPosConfigurationExtension" minOccurs="0"/>
  </xs:sequence>
  <xs:anyAttribute processContents="lax"/>
</xs:complexType>
```

FIG. 8E

```
<xs:complexType name="OSDTextConfiguration">
  <xs:sequence>
    <xs:element name="Type" type="xs:string"/>
    <xs:element name="DateFormat" type="xs:string" minOccurs="0"/>
    <xs:element name="TimeFormat" type="xs:string" minOccurs="0"/>
    <xs:element name="FontSize" type="xs:int" minOccurs="0"/>
    <xs:element name="FontColor" type="tt:OSDColor" minOccurs="0"/>
    <xs:element name="BackgroundColor" type="tt:OSDColor" minOccurs="0"/>
    <xs:element name="PlainText" type="xs:string" minOccurs="0"/>
    <xs:element name="Extension" type="tt:OSDTextConfigurationExtension" minOccurs="0"/>
  </xs:sequence>
  <xs:anyAttribute processContents="lax"/>
</xs:complexType>
```

FIG. 8F

```
<xs:complexType name="OSDImgConfiguration">
  <xs:sequence>
    <xs:element name="ImgPath" type="xs:anyURI"/>
    <xs:element name="Extension" type="tt:OSDImgConfigurationExtension" minOccurs="0"/>
  </xs:sequence>
  <xs:anyAttribute processContents="lax"/>
</xs:complexType>
```

FIG. 8G

```
<xs:complexType name="OSDConfigurationExtension">
  <xs:sequence>
    <xs:any namespace="##any" processContents="lax" minOccurs="0" maxOccurs="unbounded"/>
  </xs:sequence>
  <xs:anyAttribute processContents="lax"/>
</xs:complexType>
```

FIG. 9A

```
<xs:complexType name="OSDConfigurationOptions">
    <xs:sequence>
        <xs:element name="MaximumNumberOfOSDs" type="xs:int" />
        <xs:element name="Type" type="tt:OSDType" maxOccurs="unbounded" />
        <xs:element name="PositionOption" type="xs:string" maxOccurs="unbounded" />
        <xs:element name="TextOption" type="tt:OSDTextOptions" minOccurs="0" />
        <xs:element name="ImageOption" type="tt:OSDImgOptions" minOccurs="0" />
        <xs:element name="Extension" type="tt:OSDConfigurationOptionsExtension" minOccurs="0"/>
    </xs:sequence>
    <xs:anyAttribute processContents="lax"/>
</xs:complexType>
```

FIG. 9B

```
<xs:complexType name="OSDTextOptions">
    <xs:sequence>
        <xs:element name="Type" type="xs:string" maxOccurs="unbounded"/>
        <xs:element name="FontSizeRange" type="tt:IntRange" minOccurs="0"/>
        <xs:element name="DateFormat" type="xs:string" minOccurs="0" maxOccurs="unbounded"/>
        <xs:element name="TimeFormat" type="xs:string" minOccurs="0" maxOccurs="unbounded"/>
        <xs:element name="FontColor" type="tt:OSDColorOptions" minOccurs="0"/>
        <xs:element name="BackgroundColor" type="tt:OSDColorOptions" minOccurs="0"/>
        <xs:element name="Extension" type="tt:OSDTextOptionsExtension" minOccurs="0"/>
    </xs:sequence>
    <xs:anyAttribute processContents="lax"/>
</xs:complexType>
```

FIG. 9C

```
<xs:complexType name="OSDImgOptions">
    <xs:sequence>
        <xs:element name="ImagePath" type="xs:anyURI" maxOccurs="unbounded"/>
        <xs:element name="Extension" type="tt:OSDImgOptionsExtension" minOccurs="0"/>
    </xs:sequence>
    <xs:anyAttribute processContents="lax"/>
</xs:complexType>
```

FIG. 9D

```
<xs:complexType name="OSDConfigurationOptionsExtension">
    <xs:sequence>
        <xs:any namespace="##any" processContents="lax" minOccurs="0" maxOccurs="unbounded"/>
    </xs:sequence>
    <xs:anyAttribute processContents="lax"/>
</xs:complexType>
```

FIG. 9E

```
<xs:complexType name="IntRange">
    <xs:sequence>
        <xs:element name="Min" type="xs:int"/>
        <xs:element name="Max" type="xs:int"/>
    </xs:sequence>
</xs:complexType>
```

FIG. 10A

```
<xs:complexType name="OSDColorOptions">
   <xs:sequence>
      <xs:element name="Color" type="tt:ColorOptions" minOccurs="0"/>
      <xs:element name="Transparent" type="tt:IntRange" minOccurs="0"/>
      <xs:element name="Extension" type="tt:OSDColorOptionsExtension" minOccurs="0"/>
   </xs:sequence>
   <xs:anyAttribute processContents="lax"/>
</xs:complexType>
```

FIG. 10B

```
<xs:complexType name="OSDTextOptionsExtension">
   <xs:sequence>
      <xs:any namespace="##any" processContents="lax" minOccurs="0" maxOccurs="unbounded"/>
   </xs:sequence>
   <xs:anyAttribute processContents="lax"/>
</xs:complexType>
```

FIG. 10C

```
<xs:complexType name="ColorOptions">
   <xs:sequence>
      <xs:choice>
         <xs:element name="ColorList" type="tt:Color" maxOccurs="unbounded"/>
         <xs:element name="ColorspaceRange" type="tt:ColorSpaceRange" maxOccurs="unbounded"/>
      </xs:choice>
   </xs:sequence>
   <xs:anyAttribute processContents="lax"/>
</xs:complexType>
```

FIG. 10D

```
<xs:complexType name="Color">
   <xs:attribute name="X" type="xs:float" use="required"/>
   <xs:attribute name="Y" type="xs:float" use="required"/>
   <xs:attribute name="Z" type="xs:float" use="required"/>
   <xs:attribute name="Colorspace" type="xs:anyURI"/>
</xs:complexType>
```

FIG. 10E

```
<xs:complexType name="ColorSpaceRange">
    <xs:sequence>
        <xs:element name="X" type="tt:FloatRange"/>
        <xs:element name="Y" type="tt:FloatRange"/>
        <xs:element name="Z" type="tt:FloatRange"/>
        <xs:element name="Colorspace" type="xs:anyURI"/>
    </xs:sequence>
    <xs:anyAttribute processContents="lax"/>
</xs:complexType>
```

FIG. 10F

```
<xs:complexType name="FloatRange">
    <xs:sequence>
        <xs:element name="Min" type="xs:float"/>
        <xs:element name="Max" type="xs:float"/>
    </xs:sequence>
</xs:complexType>
```

FIG. 11

```xml
<OSDOptions>
        <MaximumNumberOfOSDs>3</MaximumNumberOfOSDs>
        <Type>Text</Type>
        <Type>Image</Type>
        <PositionOption>LowerRight</PositionOption>
        <TextOption>
                <Type>Plain</Type>
                <Type>Date</Type>
                <Type>Time</Type>
                <DateFormat>yyyy/MM/dd</DateFormat>
                <TimeFormat>HH:mm:ss</TimeFormat>
                <FontColor>
                        <Transparent>
                                <Min>0</Min>
                                <Max>2</Max>
                        </Transparent>
                </FontColor>
                <BackgroundColor>
                        <Transparent>
                                <Min>0</Min>
                                <Max>2</Max>
                        </Transparent>
                </BackgroundColor>
                <Extension />
        </TextOption>
        <ImageOption>
                <ImagePath></ImagePath>
                <Extension />
        </ImageOption>
        <Extension />
</OSDOptions>
```

APPARATUS, CONTROL METHOD AND PROGRAM THEREOF, AND EXTERNAL APPARATUS

BACKGROUND OF THE INVENTION

1. Field of the Invention

The present invention relates to an apparatus, a control method and a program thereof, an external apparatus, a control method and a program thereof, an image capturing system, and a control method and a program thereof. In particular, the present invention relates to a technology that can overlay information such as an image on a captured image.

2. Description of the Related Art

There has been a technology that overlays a predetermined character, a figure, or the like, at a predetermined position on an image. For example, an OnScreenDisplay function (hereinafter, occasionally called OSD function) of displaying an OSD image at a fixed position on an image has been installed.

Japanese Patent Laid-Open No. 11-146275 discloses an image processing display device that displays a video image in a transparent manner from beneath an OSD image based on a blend value relating to the OSD image.

Japanese Patent Laid-Open No. 9-163258 discloses visual equipment that outputs control command data for OSD display to an interface cable, and visual equipment that receives the control command data output to the interface cable.

SUMMARY OF THE INVENTION

Accordingly, there is provided an apparatus according to an aspect of the invention for communicating with an external apparatus via a network. The apparatus includes an image capturing section configured to capture an image of an object; an overlaying section configured to overlay overlay information on the captured image; and a transmitting section configured to transmit transparency information indicative of whether or not a transparency can be set for each of a first portion and a second portion of the overlay information, to the external apparatus.

Also, there is provided an external apparatus according to another aspect of the invention for communicating with an apparatus via a network, the apparatus including an image capturing unit configured to capture an image of an object and an overlaying unit configured to overlay overlay information on the captured image. The external apparatus includes an acquiring section configured to acquire transparency information indicative of whether or not a transparency can be set for each of a first portion and a second portion of the overlay information from the apparatus.

Also, there is provided a control method of an apparatus according to still another aspect of the invention for communicating with an external apparatus via a network. The control method includes capturing an image of an object; overlaying overlay information on the captured image; and transmitting transparency information indicative of whether or not a transparency can be set for each of a first portion and a second portion of the overlay information to the external apparatus.

Also, there is provided a computer executable program for controlling an apparatus according to yet another aspect of the invention for communicating with an external apparatus via a network. The program causes the computer to execute instructions including capturing an image of an object; overlaying overlay information on the captured image; and transmitting transparency information indicative of whether or not a transparency can be set for each of a first portion and a second portion of the overlay information to the external apparatus.

Also, there is provided an apparatus according to a further aspect of the invention for communicating with an external apparatus via a network. The apparatus includes an image capturing section configured to capture an image of an object; an overlaying section configured to overlay overlay information on the captured image; and a transmitting section configured to, if the overlay information is first overlay information, transmit transparency information indicative that a transparency cannot be set, to the external apparatus, and if the overlay information is second overlay information, transmit transparency information indicative of whether or not the transparency can be set for each of a first portion and a second portion of the second overlay information, to the external apparatus.

Also, there is provided an external apparatus according to a still further aspect of the invention for communicating with an apparatus via a network, the apparatus including an image capturing unit configured to capture an image of an object and an overlaying unit configured to overlay overlay information on the captured image. The external apparatus includes an acquiring section configured to, if the overlay information is first overlay information, acquire transparency information indicative that a transparency cannot be set, from the apparatus, and if the overlay information is second overlay information, acquire transparency information indicative of whether or not the transparency can be set for each of a first portion and a second portion of the second overlay information, from the apparatus.

Also, there is provided a control method of an apparatus according to a yet further aspect of the invention for communicating with an external apparatus via a network. The control method includes capturing an image of an object; overlaying overlay information on the captured image; and transmitting, if the overlay information is first overlay information, transparency information indicative that a transparency cannot be set, to the external apparatus, and if the overlay information is second overlay information, transmitting transparency information indicative of whether or not the transparency can be set for each of a first portion and a second portion of the second information, to the external apparatus.

Also, there is provided a computer executable program for controlling an apparatus according to a yet further aspect of the invention for communicating with an external apparatus via a network. The program causes the computer to execute instructions including capturing an image of an object; overlaying overlay information on the captured image; and transmitting, if the overlay information is first overlay information, transparency information indicative that a transparency cannot be set, to the external apparatus, and if the overlay information is second overlay information, transmitting transparency information indicative of whether or not the transparency can be set for each of a first portion and a second portion of the second information, to the external apparatus.

Further features of the present invention will become apparent from the following description of exemplary embodiments with reference to the attached drawings.

BRIEF DESCRIPTION OF THE DRAWINGS

FIGS. 3A and 3B each show an example of processing for merging a captured image with an OSD image according to the first embodiment of the invention.

FIG. 6 is a sequence diagram for describing a command sequence of the monitoring camera and a client apparatus according to the first embodiment of the invention.

FIGS. 8A to 8G show an example of a definition of OSDConfiguration type according to the first embodiment of the invention.

FIGS. 9A to 9E show an example of a definition of OSDConfigurationOptions type according to the first embodiment of the invention.

FIGS. 10A to 10F show an example of a definition of OSDConfigurationOptions type according to the first embodiment of the invention.

FIG. 11 shows a configuration of a response of GetOSDConfigurationOptions type according to the first embodiment of the invention.

DESCRIPTION OF THE EMBODIMENTS

An embodiment of the invention is described below with reference to the attached drawings. In the configuration described in the embodiment is merely an example, and the invention is not limited to the illustrated configuration.

First Embodiment

Figure 1A:
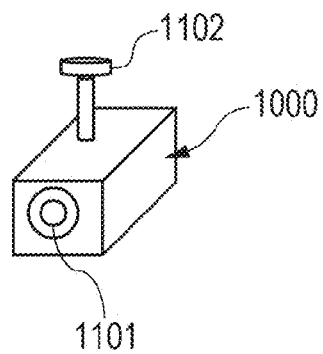
FIG. 1A shows an example of a monitoring camera according to a first embodiment of the invention.

FIG. 1A shows an example of a monitoring camera according to this embodiment. A monitoring camera 1000 in FIG. 1A includes a housing 1101 having a lens, and an arm mechanism 1102. The arm mechanism 1102 hangs the monitoring camera 1000 from an installation position such as a ceiling. Also, the arm mechanism 1102 can change an image capturing direction of the monitoring camera 1000 by rotating the housing 1101 in a pan direction and a tilt direction, and also can fix the image capturing direction.

It is assumed that the monitoring camera 1000 according to this embodiment is an image capturing apparatus that captures a movie, and more particularly a network camera used for monitoring. Also, it is assumed that the arm mechanism 1102 includes a stepping motor for rotating the housing 1101 in the pan direction, and a stepping motor for rotating the housing 1101 in the tilt direction.

Figure 1B:
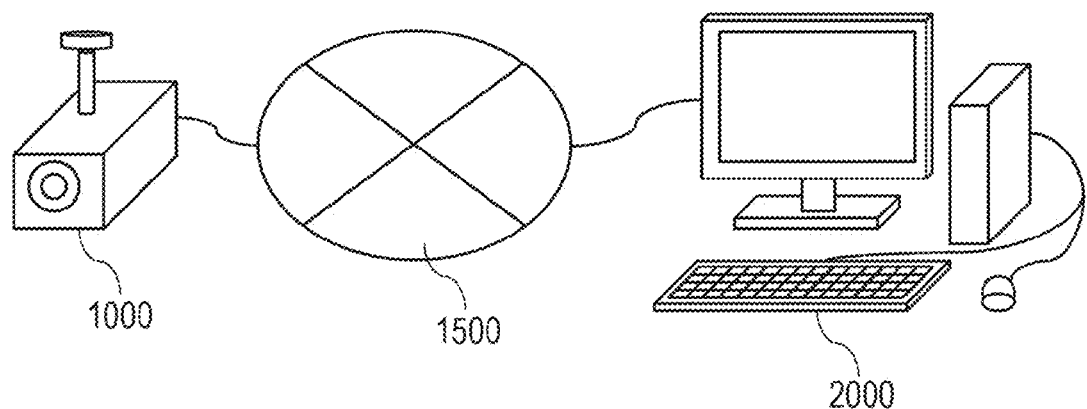
FIG. 1B shows an example of a system configuration of a monitoring system according to the first embodiment.

FIG. 1B shows an example of a system configuration of a monitoring system according to this embodiment. In the monitoring system according to this embodiment, the monitoring camera 1000 is connected with a client apparatus 2000 through an IP network 1500 so that mutual communication can be made. The client apparatus 2000 in this embodiment is an example of an external apparatus such as a PC. Also, the monitoring system according to this embodiment corresponds to an image capturing system.

It is assumed that the IP network 1500 is formed of a plurality of routers, switches, and cables that meet a communication standard, for example, Ethernet (registered trademark). However, in this embodiment, the communication standard, scale, and configuration are not limited as long as communication can be made between the monitoring camera 1000 and the client apparatus 2000.

For example, the IP network 1500 may be formed of the Internet, a wired local area network (LAN), a wireless LAN, a wide area network (WAN), or the like. The monitoring camera 1000 according to this embodiment may be compatible with Power Over Ethernet (PoE, registered trademark), and may be supplied with power through a LAN cable.

The client apparatus 2000 transmits various commands to the monitoring camera 1000. The commands include, for example, a command of changing an image capturing parameter (described later) and a command of starting image streaming (described later). The details of these commands will be described later. Also, the monitoring camera 1000 transmits a response and an image stream to the client apparatus 2000.

Figure 2:
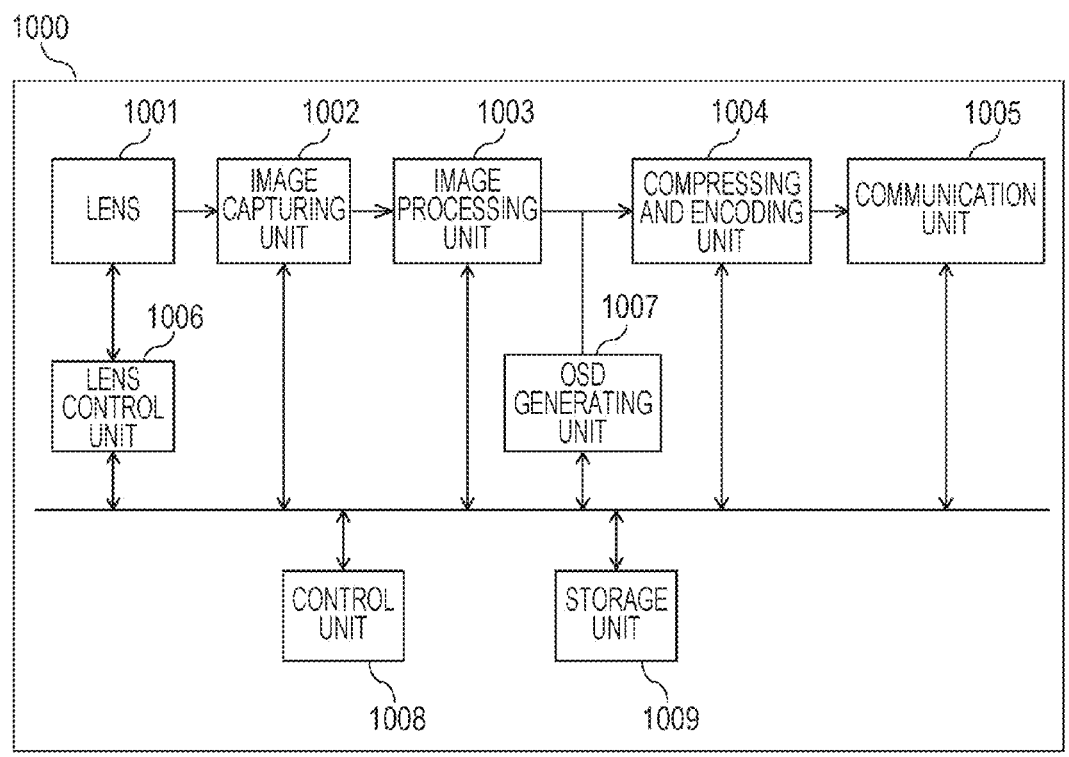
FIG. 2 shows an example of a hardware configuration of the monitoring camera according to the first embodiment of the invention.

FIG. 2 shows an example of a hardware configuration of the monitoring camera 1000 according to this embodiment. In FIG. 2, a lens 1001 focuses an image of an object at an image capturing unit 1002. The image capturing unit 1002 generates a captured image by capturing the image of the object focused by the lens 1001. Then, the image capturing unit 1002 outputs the generated captured image to an image processing unit 1003.

The image processing unit 1003 executes image processing on the captured image output from the image capturing unit 1002 in accordance with an instruction of a control unit 1008 (described later). The image processing unit 1003 outputs the captured image after the image processing to a compressing and encoding unit 1004. The compressing and encoding unit 1004 compresses and encodes the captured image output from the image processing unit 1003 in accordance with an instruction of the control unit 1008.

A communication unit 1005 distributes the captured image compressed and encoded by the compressing and encoding unit 1004 to the client apparatus 2000 through the IP network 1500. The communication unit 1005 receives an OSD setting command transmitted from the client apparatus 2000, through the IP network 1500. Further, the communication unit 1005 receives an encoding setting command transmitted from the client apparatus 2000, through the IP network 1500.

Also, the communication unit 1005 receives a setting command for the captured image (hereinafter, occasionally called image setting command). This image setting command includes, for example, a setting command for the image size, and a setting command relating to exposure control, such as white balance and gain, for an object image. The communication unit 1005 in this embodiment corresponds to a receiving unit that receives an image from the client apparatus 2000.

A lens control unit 1006 controls the lens 1001 so that the lens 1001 changes the aperture stop in accordance with the image of the object, the lens 1001 adjusts the focus position and hence executes focus adjustment, and an infrared cut filter is inserted to and removed from the lens 1001. Also, an OSD generating unit 1007 generates an OSD image in accordance with an instruction of the control unit 1008. The OSD generating unit 1007 outputs the generated OSD image to the compressing and encoding unit 1004.

The compressing and encoding unit 1004 merges the OSD image output from the OSD generating unit 1007 with the captured image output from the image processing unit 1003. For example, the compressing and encoding unit 1004 overlays the OSD image output from the OSD generating unit 1007 on the captured image output from the image processing unit 1003. Then, the compressing and encoding unit 1004 compresses and encodes the merged captured image. The compressing and encoding unit 1004 outputs the compressed and encoded captured image to the communication unit 1005.

The compressing and encoding unit 1004 according to this embodiment corresponds to an overlaying unit that overlays the OSD image on the captured image output from the image capturing unit 1002. Also, the OSD image according to this embodiment corresponds to overlay information.

The control unit 1008 controls the entire monitoring camera 1000. The control unit 1008 is formed of, for example, a central processing unit (CPU), and executes a program stored in a storage unit 1009 (described later). Alternatively, the control unit 1008 may execute control by using hardware.

The control unit 1008 analyzes the image setting command received from the communication unit 1005. Then, the control unit 1008 generates image setting information based on the analyzed image setting command. The control unit 1008 outputs the generated image setting information to the image processing unit 1003, and simultaneously to the output, stores the generated image setting information in the storage unit 1009.

The image processing unit 1003 executes image processing on the captured image output from the image capturing unit 1002, in accordance with the image setting information output from the control unit 1008, and outputs the captured image after the image processing to the compressing and encoding unit 1004.

The control unit 1008 analyzes the OSD setting command received from the communication unit 1005. Then, the control unit 1008 generates OSD setting information based on the analyzed OSD setting command. The control unit 1008 outputs the generated OSD setting information to the OSD generating unit 1007, and simultaneously to the output, stores the generated OSD setting information in the storage unit 1009.

The OSD generating unit 1007 generates the OSD image in accordance with the OSD setting information output from the control unit 1008. The OSD setting information includes the color, transparency, and overlay position information, etc., of the OSD image. The overlay position information is information indicative of the position at which the OSD image is overlaid on the captured image output from the image processing unit 1003.

The control unit 1008 analyzes the encoding setting command received from the communication unit 1005. Then, the control unit 1008 generates encoding setting information based on the analyzed encoding setting command. The control unit 1008 stores the generated encoding setting information in the storage unit 1009, and outputs the generated encoding setting information to the compression and encoding unit 1004.

The encoding setting information output from the control unit 1008 includes designation information relating to, for example, the encoding method of data and image size (or image resolution).

The compressing and encoding unit 1004 converts the captured image output from the image processing unit 1003 into an image with the image size or image resolution designated in the encoding setting information output from the control unit 1008. Alternatively, the compressing and encoding unit 1004 converts the merged image in which the captured image output from the image processing unit 1003 is merged with the OSD image output from the OSD generating unit 1007, into an image with the image size or image resolution designated in the encoding setting information output from the control unit 1008.

The compressing and encoding unit 1004 compresses and encodes the converted captured image by the encoding method designated in the encoding setting information output from the control unit 1008. In this embodiment, it is assumed that the designated encoding method includes, for example, JPEG, MPEG, H.264, and H.265.

Since the above-described operation is provided, the monitoring camera 1000 according to this embodiment can convert an image of a single object into a plurality of images with different image sizes. The monitoring camera 1000 can compress and encode the plurality of converted images into a plurality of images with different encoding methods. The monitoring camera 1000 can substantially simultaneously distribute the compressed and encoded images by streaming.

The images distributed by streaming are output to the outside through the communication unit 1005.

Figure 14:
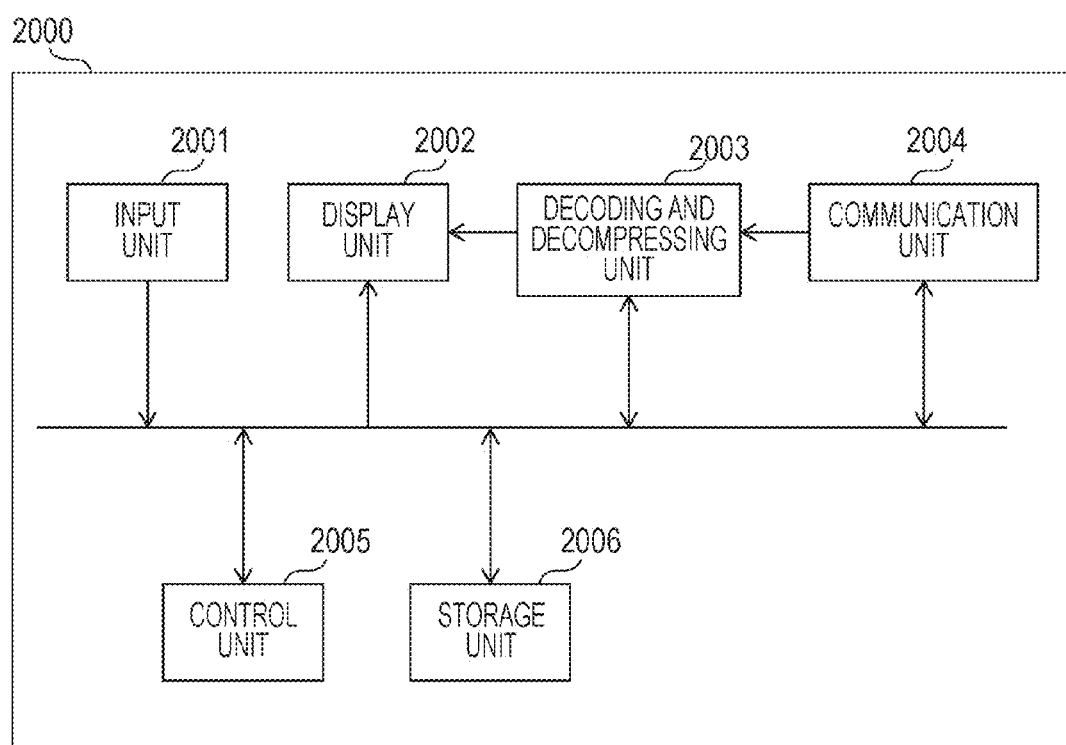
FIG. 14 shows an example of a hardware configuration of the client apparatus according to the first embodiment of the invention.

FIG. 14 shows an example of a hardware configuration of the client apparatus 2000 according to this embodiment. The client apparatus 2000 according to this embodiment is formed as a computer apparatus connected with the IP network 1500.

A control unit 2005 controls the entire client apparatus 2000. The control unit 2005 is formed of, for example, a CPU, and executes a program stored in a storage unit 2006 (described later). Alternatively, the control unit 2005 may execute control by using hardware. The storage unit 2006 is used as a storage region of a program executed by the control unit 2005, a work region during execution of the program, and a storage region of data.

A communication unit 2004 transmits a command or the like to the monitoring camera 1000 in response to an instruction of the control unit 2005. Also, the communication unit 2004 receives a response to a command, an image distributed by streaming, or the like, from the monitoring camera 1000 in response to an instruction of the control unit 2005.

An input unit 2001 receives the input of an instruction from a user. For example, the input unit 2001 can accept the input of a transmission instruction of any of various commands for the monitoring camera 1000, as an instruction from the user. Also, the input unit 2001 can accept the input of a response from the user for an inquiry message or the like to the user, which is generated when the control unit 2005 executes a program stored in the storage unit 2006.

A decoding and decompressing unit 2003 decodes and decompresses the image output from the communication unit 2004. The decoding and decompressing unit 2003 outputs the decoded and decompressed image to a display unit 2002. The display unit 2002 displays the image output from the decoding and decompressing unit 2003. Also, the display unit 2002 can display the inquiry message or the like to the user, which is generated when the control unit 2005 executes a program stored in the storage unit 2006.

Figure 3A:
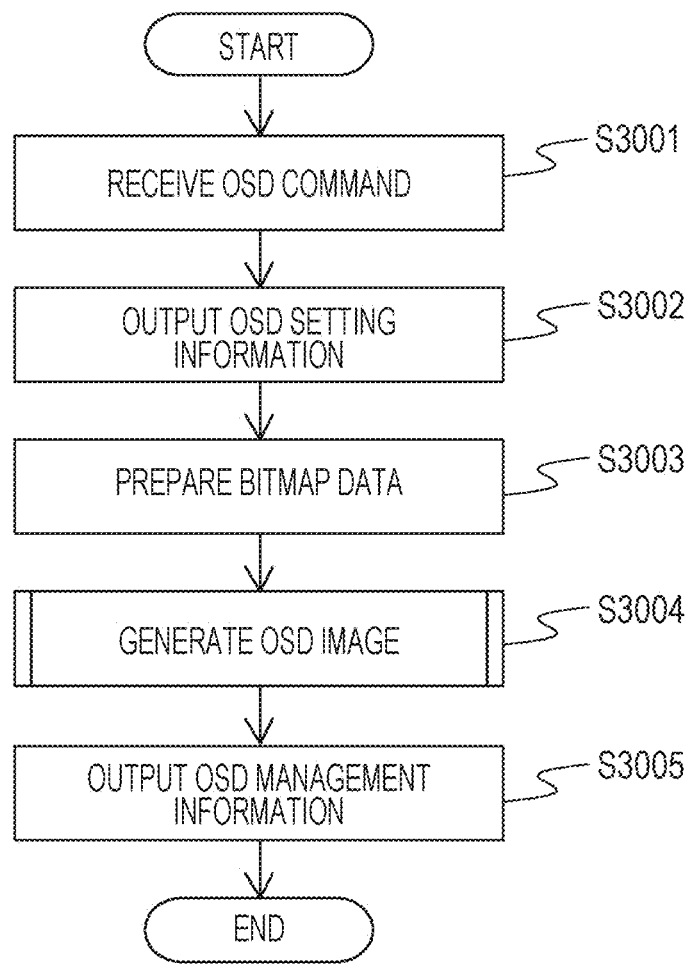

FIGS. 3A and 3B are each a flowchart showing an example processing for merging the captured image output from the image capturing unit 1002 with the OSD image output from the OSD generating unit 1007. In particular, FIG. 3A is a flowchart showing the entire example processing. FIG. 3B is a flowchart showing an example of step S3004 in FIG. 3A. It is assumed that the processing shown in FIGS. 3A and 3B is executed by the control unit 1008.

In step S3001, the control unit 1008 receives the OSD setting command transmitted from the client apparatus 2000, through the communication unit 1005. The control unit 1008 analyzes the OSD setting command, and generates the OSD setting information.

In step S3002, the control unit 1008 outputs the OSD setting information generated in step S3001 to the OSD generating unit 1007. Also, simultaneously to the output, the control unit 1008 outputs the image setting information set in the image processing unit 1003 to the OSD generating unit 1007. The image setting information includes, for example, information relating to the image size.

In step S3003, the control unit 1008 instructs the OSD generating unit 1007 to prepare bitmap data for the OSD image. It is assumed that the bitmap data is held in a memory provided in the OSD generating unit 1007.

For example, if the OSD image is a text, the control unit 1008 instructs the OSD generating unit 1007 to read plural pieces of font data with different sizes from the storage unit 1009, and to prepare plural pieces of bitmap data corresponding to the image size of the captured image. This is to allow the OSD images to be overlaid on the captured image with a uniform ratio with respect to the captured image regardless of the image size of the captured image.

In step S3004, the control unit 1008 instructs the OSD generating unit 1007 to generate an OSD image as bitmap data. The OSD image corresponds to the transparency and color designated in the OSD setting information generated in step S3001. The processing in step S3004 will be described in detail with reference to FIG. 3B.

In step S3005, the control unit 1008 instructs the OSD generating unit 1007 to output OSD management information to the compressing and encoding unit 1004.

The OSD management information is for determining the merging position of the bitmap data with respect to the captured image output from the image processing unit 1003. Also, the merging position is obtained based on overlay position information of the OSD image designated in the OSD setting information received in step S3001, and the bitmap data generated in step S3004.

Also, the compressing and encoding unit 1004 merges the OSD image output from the OSD generating unit 1007 with the captured image output from the image processing unit 1003. During the merge, the compressing and encoding unit 1004 reflects the image size of the captured image or the resolution of the captured image on the OSD image and the OSD management information output from the OSD generating unit 1007.

The compressing and encoding unit 1004 compresses and encodes the merged captured image by the encoding method designated in the encoding setting information output from the control unit 1008. With this processing, the captured image merged with the OSD image is distributed to the client apparatus 2000 by streaming through the communication unit 1005.

If the OSD image designated in the OSD setting information includes an element, which is updated every second, such as time, the OSD generating unit 1007 reflects a new OSD image and new OSD management information, on the compressing and encoding unit 1004 every update.

FIG. 3B is a flowchart for describing the OSD image generating processing in step S3004 shown in FIG. 3A. The processing shown in FIG. 3B is executed by the control unit 1008.

In step S3101, the control unit 1008 determines the transparency of the font designated in the OSD setting information generated in step S3001. For example, in this embodiment, it is assumed that the transparency of the font has three levels. Based on this assumption, the control unit 1008 advances the processing to step S3102 if the transparency of the font designated in the OSD setting information generated in step S3001 is 0.

The control unit 1008 advances the processing to step S3103 if the transparency of the font designated in the OSD setting information generated in step S3001 is 1. The control unit 1008 advances the processing to step S3104 if the transparency of the font designated in the OSD setting information generated in step S3001 is 2.

In step S3102, the control unit 1008 instructs the OSD generating unit 1007 to generate a text so that the font of the text of the OSD image is blended by 100% with the captured image by the compressing and encoding unit 1004. Accordingly, the captured image output form the image processing unit 1003 is not viewed in a transparent manner from beneath the text of the generated OSD image.

In step S3103, the control unit 1008 instructs the OSD generating unit 1007 to generate a text so that the font of the text of the OSD image is blended by 50% with the captured image by the compressing and encoding unit 1004. Accordingly, the captured image output form the image processing unit 1003 may be viewed in a transparent manner from beneath the text of the generated OSD image.

In step S3104, the control unit 1008 instructs the OSD generating unit 1007 to generate a text so that the font of the text of the OSD image is not blended with the captured image by the compressing and encoding unit 1004. Accordingly, the text of the generated OSD image is not viewed to be overlaid on the captured image output from the image processing unit 1003.

In step S3105, the control unit 1008 determines the transparency of the background designated in the OSD setting information generated in step S3001. For example, in this embodiment, it is assumed that the transparency of the background has three levels. Based on this assumption, the control unit 1008 advances the processing to step S3106 if the transparency of the background designated in the OSD setting information generated in step S3001 is 0.

Also, the control unit 1008 advances the processing to step S3107 if the transparency of the background designated in the OSD setting information generated in step S3001 is 1. The control unit 1008 advances the processing to step S3108 if the transparency of the background designated in the OSD setting information generated in step S3001 is 2.

In step S3106, the control unit 1008 instructs the OSD generating unit 1007 to generate an OSD image so that the background of the text of the OSD image is blended by 100% with the captured image by the compressing and encoding unit 1004. Accordingly, the captured image output form the image processing unit 1003 is not viewed in a transparent manner from beneath the background of the generated OSD image.

In step S3107, the control unit 1008 instructs the OSD generating unit 1007 to generate a background so that the background of the text of the OSD image is blended by 50% with the captured image by the compressing and encoding unit 1004. Accordingly, the captured image output form the image processing unit 1003 may be viewed in a transparent manner from beneath the background of the generated OSD image.

In step S3108, the control unit 1008 instructs the OSD generating unit 1007 to generate an OSD image so that the background of the text of the OSD image is not blended with the captured image by the compressing and encoding unit 1004. Accordingly, the background of the generated OSD image is not viewed to be overlaid on the captured image output from the image processing unit 1003.

Figure 4:
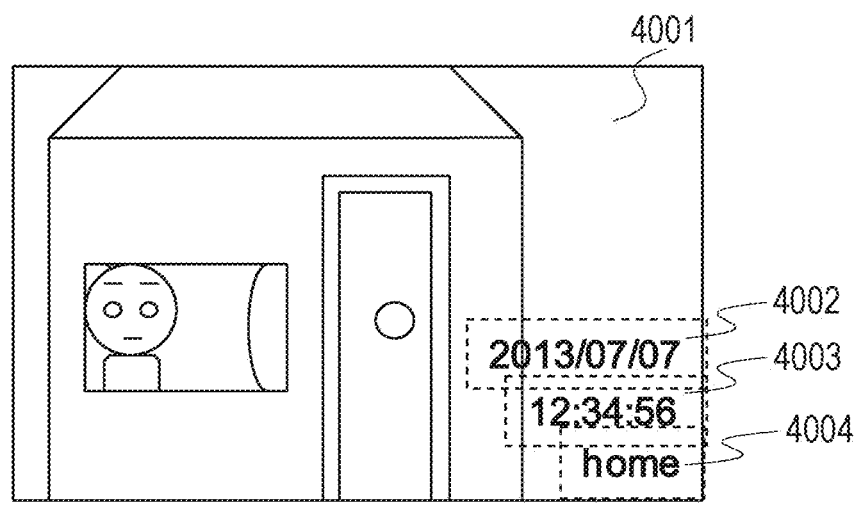
FIG. 4 shows an example of an image in which a captured image is merged with an OSD image according to the first embodiment of the invention.

FIG. 4 shows an example image in which a captured image output from the image processing unit 1003 is merged with an OSD image output from the OSD generating unit 1007. In the image shown in FIG. 4, an image area 4001 is an area in which the captured image output from the image processing unit 1003 is displayed. An image area 4002 is an area for displaying the date on which an object corresponding to the captured image output from the image processing unit 1003 was captured.

Whether the date is displayed in the image area 4002 or not is designated in the OSD setting information.

An image area 4003 is an area for displaying the time at which the object corresponding to the captured image output from the image processing unit 1003 was captured. Whether the time is displayed in the image area 4003 or not is designated in the OSD setting information. An image area 4004 is an area for displaying a text for describing the object corresponding to the captured image output from the image processing unit 1003.

The text is a plain text without a change over time. Also, this text corresponds to the text information input to the client apparatus 2000 by the user. Also, the text displayed in the image area 4004 is included in the OSD setting information.

Figure 5A:
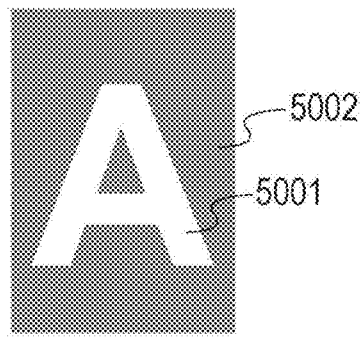
FIGS. 5A and 5B each show an example of font data used for a text included in an OSD image according to the first embodiment of the invention.
Figure 5B:
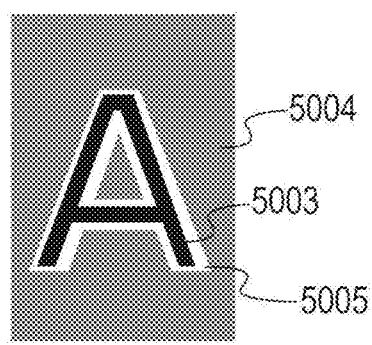

FIGS. 5A and 5B each show an example of font data used for the text included in the OSD image. The font data is held in the storage unit 1009. The font data is used for displaying the date, time, and plain text in FIG. 4.

A data area 5001 in FIG. 5A represents a font used for the text included in the OSD image. Also, a data area 5002 represents a background of the text included in the OSD image.

A data area 5003 in FIG. 5B represents a font used for a text included in the OSD image. Also, a data area 5004 represents an outline of a font used for the text included in the OSD image. The outline is the background of the text included in the OSD image. A data area 5005 represents a non-overlay area that is not overlaid on the captured image output from the image processing unit 1003.

The data area 5005 corresponds to a portion obtained when the data area 5003 and the data area 5004 are removed from the OSD image.

FIG. 6 is a sequence diagram for describing a typical command sequence between the monitoring camera 1000 and the client apparatus 2000 from when the setting of the parameter is started for the image to be distributed by streaming until when the image is distributed by streaming.

A transaction according to this embodiment indicates a pair of a command that is transmitted from the client apparatus 2000 to the monitoring camera 1000 and a response that is returned from the monitoring camera 1000 to the client apparatus 2000.

Reference sign 6000 in FIG. 6 is a transaction for apparatus search. The client apparatus 2000 transmits Probe command including a predetermined search condition for searching a monitoring camera, which is connected on the network, by multicast. Among monitoring cameras, which have received the Probe command, a monitoring camera that matches the search condition returns ProbeMatch command to the client apparatus 2000, which is a transmission source of Probe command, and the search is completed.

Reference sign 6001 is GetProfiles transaction. This transaction is for acquiring MediaProfile corresponding to a distribution profile. The client apparatus 2000 transmits GetProfiles command to the monitoring camera 1000. Then, the monitoring camera 1000, which has received GetProfiles command, transmits a list of MediaProfile to the client apparatus 2000.

Accordingly, the client apparatus 2000 acquires the list of MediaProfile that can be currently used in the monitoring camera 1000, together with a distribution profile ID for identifying MediaProfile.

Reference sign 6002 is GetVideoSources transaction. This transaction is for acquiring the function of the image processing unit 1003. The client apparatus 2000 transmits GetVideoSources command to the monitoring camera 1000. Then, the monitoring camera 1000, which has received GetVideoSources command, returns a response to this command to the client apparatus 2000.

With this transaction, the client apparatus 2000 acquires setting information of the image processing function held in the monitoring camera 1000.

Reference sign 6003 is GetVideoSourceConfigurations transaction. This transaction is for acquiring a list of image processing setting from the monitoring camera 1000. The client apparatus 2000 transmits GetVideoSources command to the monitoring camera 1000.

The monitoring camera 1000, which has received GetVideoSources command, returns a list including IDs of image processing setting held in the monitoring camera 1000 to the client apparatus 2000. The list is an example of image setting information generated by the control unit 1008.

Reference sign 6004 is GetVideoEncorderConfigurations transaction. This transaction is for acquiring the function of the compressing and encoding unit 1004. The client apparatus 2000 transmits GetVideoEncorderConfigurations command to the monitoring camera 1000. Also, the monitoring camera 1000, which has received this command, returns a response to the command.

With this transaction, the client apparatus 2000 acquires information relating to the function provided by the compressing and encoding unit 1004 of the monitoring camera 1000. The information is an example of encoding setting information generated by the control unit 1008.

Reference sign 6005 is GetVideoEncorderConfigurationOptions transaction. This transaction is for acquiring a list of setting for the compressing and encoding unit 1004. The client apparatus 2000 transmits GetVideoEncorderConfigurationOptions command to the monitoring camera 1000.

The monitoring camera 1000, which has received this command, returns a response to the command. With this transaction, the client apparatus 2000 acquires a list including IDs of compressing and encoding setting stored in the storage unit 1009 from the monitoring camera 1000.

Reference sign 6006 is CreateProfile transaction. This transaction is for requesting creation of a distribution profile. The client apparatus 2000 transmits CreateProfile command to the monitoring camera 1000. The monitoring camera 1000, which has received this command, returns a response to the command.

With this transaction, the client apparatus 2000 can newly create a distribution profile in the monitoring camera 1000, and acquire ID of the created distribution profile. Also, the monitoring camera 1000 stores the newly created distribution profile.

Reference sign 6007 is AddVideoSourceConfiguration transaction. This transaction is for requesting addition of image processing setting. The client apparatus 2000 transmits AddVideoSourceConfiguration command to the monitoring camera 1000.

The monitoring camera 1000, which has received this command, returns a response to this command to the client apparatus 2000. With this transaction, the client apparatus 2000 designates the distribution profile ID acquired in 6006 and the ID of the image processing setting acquired in 6003. The monitoring camera 1000 associates the designated distribution profile with the designated image processing setting, and stores the designated distribution profile and the image processing setting.

The command 6007 is an example of the above-described image setting command.

Reference sign 6008 is AddVideoEncorderConfiguration transaction. This transaction is for requesting addition of compressing and encoding setting. The client apparatus 2000 transmits AddVideoEncorderConfiguration command to the monitoring camera 1000. The monitoring camera 1000 returns a response to this command to the client apparatus 2000.

With this transaction, the client apparatus 2000 designates the distribution profile ID acquired in 6006 and the ID of the compressing and encoding setting acquired in 6004, and associates the distribution profile with the compressing and encoding setting. The monitoring camera 1000 associates the designated distribution profile with the designated compressing and encoding setting, and stores the designated distribution profile and the compressing and encoding setting.

Reference sign 6009 is SetVideoEncorderConfiguration transaction. This transaction is for changing the compressing and encoding setting. The client apparatus 2000 transmits SetVideoEncorderConfiguration command to the monitoring camera 1000.

The monitoring camera 1000, which has received this command, returns a response to the command. With this transaction, the client apparatus 2000 changes the content of the compressing and encoding setting acquired in 6004, based on the choice in 6005. For example, the compressing and encoding method or the segmentation size is changed. The monitoring camera 1000 stores the content of the changed compressing and encoding setting.

The command of 6008 and the command of 6009 are examples of the above-described encoding setting command.

Reference sign 6010 is GetStreamUri transaction. This transaction is for requesting acquisition of a distribution address. With this transaction, the client apparatus 2000 designates the distribution profile ID acquired in 6006, and acquires the distribution address for acquiring a video distributed based on the setting of the designated distribution profile.

The monitoring camera 1000 returns the image processing setting associated with the designated profile ID, and the distribution address for distribution of an image corresponding to the content of the compressing and encoding setting, to the client apparatus 2000.

Reference sign 6011 is DESCRIBE transaction. This transaction is for requesting acquisition of distribution information. The client apparatus 2000 transmits DESCRIBE command to the monitoring camera 1000. The monitoring camera 1000, which has received this command, returns a response to this command to the client apparatus 2000.

In this transaction, the client apparatus 2000 designates the distribution address acquired in 6010, and acquires detailed data relating to the distribution information of the monitoring camera 1000.

Reference sign 6012 is SETUP transaction. This transaction is for requesting distribution setting. The client apparatus 2000 transmits SETUP command to the monitoring camera 1000. The monitoring camera 1000, which has received this command, returns a response to this command to the client apparatus 2000.

In this transaction, the client apparatus 2000 causes the monitoring camera 1000 to prepare streaming, based on the detailed data relating to the distribution information acquired in 6011. By executing this command, a transmission method of a stream including a session number is shared between the client apparatus 2000 and the monitoring camera 1000.

Reference sign 6013 is PLAY transaction. This transaction is for starting distribution. The client apparatus 2000 transmits PLAY command to the monitoring camera 1000. The monitoring camera 1000, which has received this command, returns a response to this command to the client apparatus 2000.

When the client apparatus 2000 transmits PLAY command to the monitoring camera 1000, the client apparatus 2000 uses the session number acquired in 6012. Accordingly, the stream of the image based on the setting of the distribution profile designated for the monitoring camera 1000 can be started.

Reference sign 6014 is a stream, which is distributed form the monitoring camera 1000 to the client apparatus 2000. The stream, the distribution of which is requested to be stated in 6013, is distributed by the transmission method shared in 6012.

Reference sign 6015 is TEARDOWN transaction. This transaction is for stopping the distribution. The client apparatus 2000 transmits TEARDOWN command to the monitoring camera 1000. The monitoring camera 1000, which has received this command, returns a response to the command.

In this transaction, the client apparatus 2000 designates the session number acquired in 6012 and stops streaming in distribution.

Figure 7:
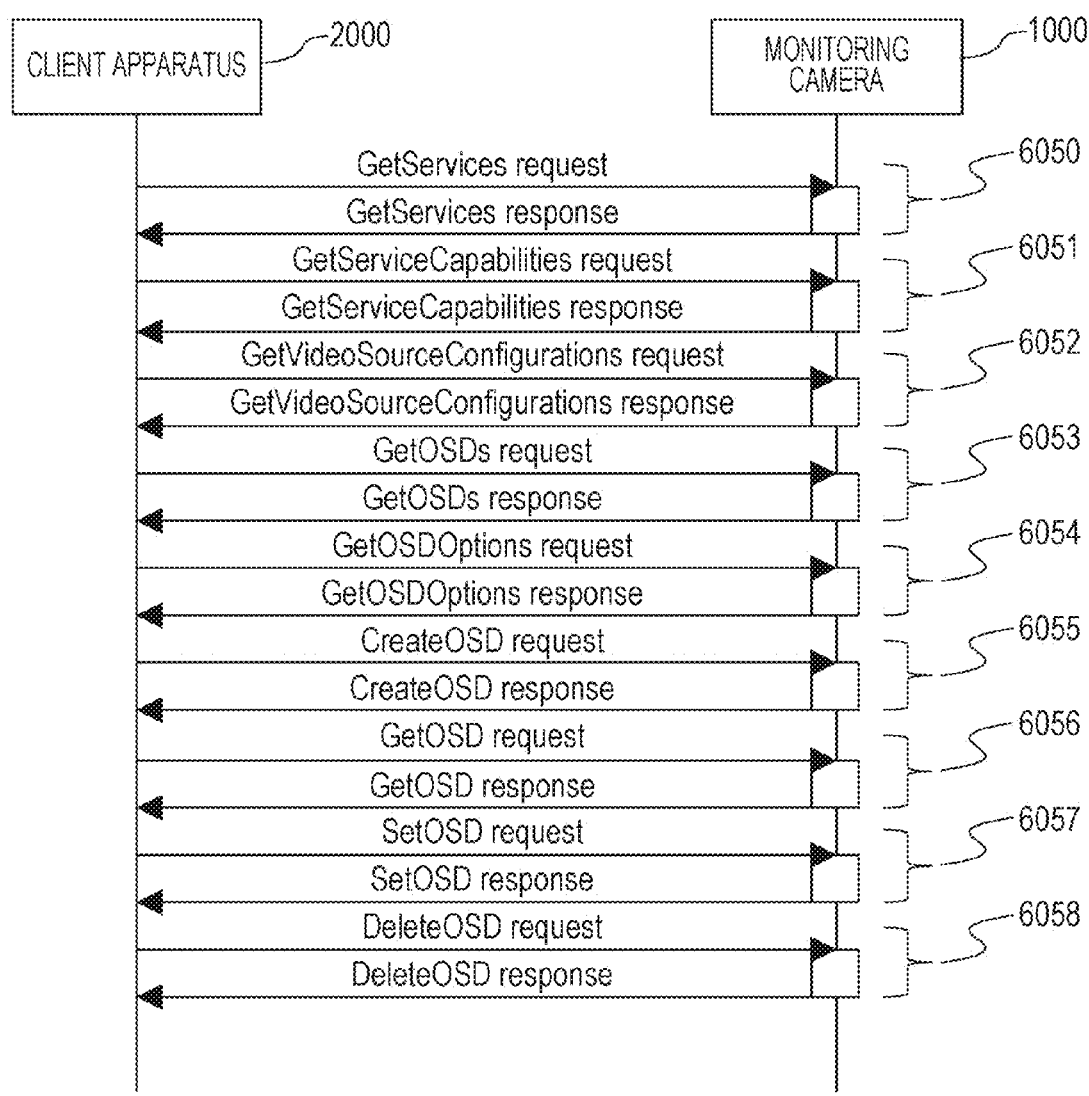
FIG. 7 is a sequence diagram for describing a command sequence of the monitoring camera and the client apparatus according to the first embodiment of the invention.

FIG. 7 shows a typical command sequence between the monitoring camera 1000 and the client apparatus 2000, for setting image overlay processing etc.

Reference sign 6050 in FIG. 7 is GetServices transaction. This transaction is for requesting acquisition of the function of the monitoring camera 1000. The client apparatus 2000 transmits GetServices command to the monitoring camera 1000. The monitoring camera 1000, which has received this command, returns a response to the command.

In this transaction, the client apparatus 2000 acquires a list of functions held in the monitoring camera 1000. The client apparatus 2000 checks whether or not the monitoring camera 1000 is capable of the image processing function and the compressing and encoding function.

Reference sign 6051 is GetServiceCapabilities transaction. This transaction is for requesting acquisition of the function corresponding to image overlay processing. The client apparatus 2000 transmits GetServiceCapabilities command to the monitoring camera 1000. The monitoring camera 1000, which has received this command, returns a response to the command.

In this transaction, the client apparatus 2000 checks whether or not the monitoring camera 1000 is capable of the image overlay processing. For example, the control unit 2005 receives overlay capability information indicative of whether or not the monitoring camera 1000 is capable of the image overlay processing, from the monitoring camera 1000 through the communication unit 2004.

Reference sign 6052 is GetVideoSourceConfigurations transaction. This transaction is for acquiring a list of image processing setting. The client apparatus 2000 transmits GetVideoSourceConfigurations command to the monitoring camera 1000.

The monitoring camera 1000, which has received this command, returns a response to this command to the client apparatus 2000. With this transaction, the client apparatus 2000 acquires a list including IDs of image processing setting held in the monitoring camera 1000, from the monitoring camera 1000. The list is an example of image setting information generated by the control unit 1008.

Reference sign 6053 is GetOSDs transaction. This transaction is for requesting acquisition of an image overlay setting list. The client apparatus 2000 transmits GetOSDs command to the monitoring camera 1000. The monitoring camera 1000, which has received this command, returns a response to this command to the client apparatus 2000.

In this transaction, the client apparatus 2000 designates the image processing setting ID acquired in 6052. Accordingly, the client apparatus 2000 acquires the list of all image overlay setting including OSDToken, which is an ID of the image overlay setting associated with the image processing setting held in the monitoring camera 1000.

Reference sign 6054 is GetOSDOptions transaction. This transaction is for acquiring an option of the image overlay setting. The client apparatus 2000 transmits GetOSDOptions command to the monitoring camera 1000. The monitoring camera 1000, which has received this command, returns a response to this command to the client apparatus 2000.

In this transaction, the client apparatus 2000 designates the image processing setting ID acquired in 6052. Accordingly, the client apparatus 2000 acquires choices that can be set and the range of setting values for each parameter of the image overlay setting associated with the image processing setting held in the monitoring camera 1000.

The parameter of the image overlay setting is provided for each of the font and background of the overlay text. If the transparency can be set, the items and range thereof are also included.

For example, if the control unit 2005 receives the overlay capability information indicative that the monitoring camera 1000 is capable of the image overlay processing through the communication unit 2004, the control unit 2005 transmits the command of 6054 to the monitoring camera 1000 through the communication unit 2004.

In contrast, for example, if the control unit 2005 receives the overlay capability information indicative that the monitoring camera 1000 is not capable of the image overlay processing through the communication unit 2004, the control unit 2005 does not transmit the command of 6054 to the monitoring camera 1000 through the communication unit 2004.

Reference sign 6055 is CreateOSD transaction. This transaction is for creating the image overlay setting. The client apparatus 2000 transmits CreateOSD command to the monitoring camera 1000. The monitoring camera 1000, which has received this command, returns a response to this command to the client apparatus 2000.

With this transaction, the client apparatus 2000 can create new image overlay setting in the monitoring camera 1000 based on the choice acquired in 6054. The monitoring camera 1000 returns OSDToken, which is an image overlay setting ID, in accordance with the image overlay setting designated by the client apparatus 2000.

Reference sign 6056 is GetOSD transaction. This transaction is for requesting acquisition of image overlay setting. The client apparatus 2000 transmits GetOSD command to the monitoring camera 1000. The monitoring camera 1000, which has received this command, returns a response to this command to the client apparatus 2000.

In this transaction, the client apparatus 2000 acquires the image overlay setting by using OSDToken, which is the image overlay setting ID acquired in 6055. The response in 6053 and the response in 6056 are examples of the OSD setting information generated by the control unit 1008.

Reference sign 6057 is SetOSD transaction. This transaction is for changing the image overlay setting. The client apparatus 2000 transmits SetOSD command to the monitoring camera 1000. The monitoring camera 1000, which has received this command, returns a response to this command to the client apparatus 2000.

In this transaction, the client apparatus 2000 designates OSDToken, which is the image overlay setting ID. Accordingly, the client apparatus 2000 can change the image overlay setting acquired in 6056 and the content of the image overlay setting newly created in 6055, based on the choice acquired in 6054. For example, the overlay position and the content of the overlay text are changed.

The command of 6055 and the command of 6057 are examples of the above-described OSD setting command.

For example, the control unit 1008 of the monitoring camera 1000, which has received the command in 6057, determines whether or not the transparency of the text included in the OSD image is designated in the received command.

Then, if the control unit 1008 determines that the transparency is designated, the control unit 1008 determines whether or not the transparency of the text included in the OSD image in the command of 6057 is in the range of transparency of the text included in the OSD image indicated by the response of 6055.

If the control unit 1008 determines that the transparency is included in the range, the control unit 1008 transmits information indicative of a normal state to the client apparatus 2000 through the communication unit 1005. In contrast, if the control unit 1008 determines that the transparency is not included in the range, the control unit 1008 transmits information indicative of an abnormal state to the client apparatus 2000 through the communication unit 1005.

For example, a case is assumed, in which the response of 6054 indicative that the transparency cannot be set for the text of the OSD image or the background of the text is transmitted from the monitoring camera 1000.

In this case, the control unit 1008 of the monitoring camera 1000, which has received the command in 6057, determines whether or not the transparency of the text included in the OSD image and the transparency of the background of the text are included in the received command. Then, if the control unit 1008 determines that the transparencies are included, the control unit 1008 transmits information indicative of the abnormal state to the client apparatus 2000 through the communication unit 1005.

Reference sign 6058 is DeleteOSD transaction. This transaction is for deleting the image overlay setting. The client apparatus 2000 transmits DeleteOSD command to the monitoring camera 1000. The monitoring camera 1000, which has received this command, returns a response to this command to the client apparatus 2000.

With this transaction, the client apparatus 2000 deletes the image overlay setting acquired in 6053 and 6056, and the image overlay setting newly created in 6055, from the monitoring camera 1000. The monitoring camera 1000 deletes the image overlay setting having OSDToken of the designated image overlay setting ID.

FIGS. 8A to 8G are each an illustration for describing a configuration of OSDConfiguration, which is data types according to this embodiment. It is assumed that the data type shown in each of FIGS. 8A to 8G is defined by using, for example, XML schema definition language (hereinafter, occasionally called XSD).

FIG. 8A illustrates a definition example of OSDConfiguration type. As shown in FIG. 8A, OSDConfiguration type is defined as a complex type by complexType declaration of XML. Also, regarding the OSDConfiguration type, complexContent element, and extension element and its base attribute indicate an extension type, in which DeviceEntity type is extended.

Also, regarding the OSDConfiguration type, sequence element indicates that data extension is executed in the defined order.

FIG. 8B illustrates a definition example of OSDRefernece type. In data of OSDReference type, simpleContent element, and extension element and its base attribute indicate an extension type, in which ReferenceToken type is extended.

FIG. 8C illustrates a definition example of OSDType type. In the definition example of OSDType, simpleType element indicates a simple type of XML, and restriction element and its base attribute indicate that the type is a value restriction type of string type. In the example in FIG. 7C, the value of OSDType is Text, Image, or Extended.

FIG. 8D illustrates a definition example of OSDPosConfiguration type. In the definition example of the OSDPosConfiguration type, complexType element indicates that the type is defined as a complex type. Also, sequence element indicates that the type is a data type in which data appears in the defined order.

FIG. 8E illustrates a definition example of OSDTextConfiguration type. In the definition example of the OSDTextConfiguration type, complexType element indicates that the type is defined as a complex type. Also, sequence element indicates that the type is a data type in which data appears in the defined order.

FIG. 8F illustrates a definition example of OSDImgConfiguration type. In the definition example of the OSDImgConfiguration type, complexType element indicates that the type is defined as a complex type. Also, sequence element indicates that the type is a data type in which data appears in the defined order.

FIG. 8G illustrates a definition example of OSDConfigurationExtension type. In the definition example of the OSDConfigurationExtension type, complexType element indicates that the type is defined as a complex type. Also, sequence element indicates that the type is a data type in which data appears in the defined order.

FIGS. 9A to 9E, and 10A to 10F are each an illustration for describing a configuration of OSDConfigurationOptions type, which is a data type according to this embodiment. It is assumed that the data type shown in each of FIGS. 9A to 9E, and 10A to 10F is defined by using XSD like FIGS. 8A to 8G.

FIG. 9A illustrates a definition example of OSDConfigurationOptions type. In the OSDConfigurationOptions type, complexType element indicates that the type is defined as a complex type. Also, sequence element indicates that the type is a data type in which data appears in the defined order.

In the OSDConfigurationOptions type, the first field is MaximumNumberOfOSDs of int type. The next field is Type of OSDType type. The next field is PositionOption of string type. The next field is TextOption of OSDTextOptions type.

The next filed is ImageOption of OSDImageOptions type. The last field is Extension of OSDConfigurationOptionsExtension type.

A descriptor of maxOccurs="unbounded" indicates that a plurality of the above-described Type fields and PositionOption fields can be present. Also, a descriptor of minOccurs="0" indicates that TextOption, ImageOption, and Extension can be omitted.

FIG. 9B illustrates a definition example of OSDTextOptions type. In the OSDTextOptions type, complexType element indicates that the type is defined as a complex type. Also, sequence element indicates that the type is a data type in which data appears in the defined order.

In OSDTextOptions type, the first field is a Type field of string type. The next field is FontSizeRange type of IntRange type. The next field is DateFormat field of string type. The next field is TimeFormat field of string type. The next field is FontColor field of OSDColorOptions type.

The next field is BackgroundColor field of OSDColorOptions type. The last field is Extension field of OSDTextOptionsExtension type.

A descriptor of maxOccurs="unbounded" indicates that a plurality of the above-described Type fields, DateFormat fields, and TimeFormat fields can be present in the OSDTextOptions type.

Also, a descriptor of minOccurs="0" indicates that FontSizeRange field, DateFormat field, TimeFormat field, and FontColor field can be omitted. Similarly, a descriptor of minOccurs="0" indicates that BackgroundColor field and Extension field can be omitted.

FIG. 9C illustrates a definition example of OSDImgOptions type. In the OSDImgOptions type, complexType element indicates that the type is defined as a complex type. Also, sequence element indicates that the type is a data type in which data appears in the defined order.

In OSDImgOptions type, the first field is ImagePath field of anyURI type. The next field is Extension field of OSDImgOptionsExtension type. A descriptor of maxOccurs="unbounded" indicates that a plurality of the ImagePath fields can be present in the OSDImgOptions type.

A descriptor of minOccurs="0" indicates that Extension field can be omitted.

FIG. 9D illustrates a definition example of OSDConfigurationOptionsExtension type. In the OSDConfigurationOptionsExtension type, complexType element indicates that the type is defined as a complex type. Also, sequence element indicates that the type is a data type in which data appears in the defined order.

FIG. 9E illustrates a definition example of IntRange type. In the IntRange type, complexType element indicates that the type is defined as a complex type. Also, sequence element indicates that the type is a data type in which data appears in the defined order.

In the IntRange type, the first field is Min field of int type, and the last field is Max field of int type.

FIG. 10A illustrates a definition example of OSDColorOptions type. In the OSDColorOptions type, complexType element indicates that the type is defined as a complex type. Also, sequence element indicates that the type is a data type in which data appears in the defined order.

A descriptor of minOccurs="0" indicates that Color field, Transparent field, and Extension field can be omitted.

FIG. 10B illustrates a definition example of OSDTextOptionsExtension type. In the OSDTextOptionsExtension type, complexType element indicates that the type is defined as a complex type. Also, sequence element indicates that the type is a data type in which data appears in the defined order.

FIG. 10C illustrates a definition example of ColorOptions type. In the ColorOptions type, complexType element indicates that the type is defined as a complex type. Also, sequence element indicates that the type is a data type in which data appears in the defined order. Also, choice element in sequence element indicates that one included in the choice element is selected.

To be specific, in the ColorOptions type, one from ColorList field, or one from ColorSpaceRange field (described later) is selected. As described above, one choice in ColorOptions type is ColorList field of Color type. Another choice is ColorSpaceRange field of ColorSpaceRange type.

A descriptor of maxOccurs="unbounded" indicates that a plurality of the ColorList fields and ColorSpaceRange fields can be present.

FIG. 10D illustrates a definition example of Color type. In the color type, attribute element allows attributes X, Y, and Z of float type to be described. Also, a descriptor of use="required" indicates that the attributes X, Y, and Z are used for the Color type. Also, in the Color type, attribute element allows an attribute Colorspace of anyURI type to be described.

FIG. 10E illustrates a definition example of ColorSpaceRange type. In the ColorSpaceRange type, complexType element indicates that the type is defined as a complex type. Also, sequence element indicates that the type is a data type in which data appears in the defined order.

The first field of ColorspaceRange type is X field, the second field thereof is Y field, and the third field is Z field. The X field, Y field, and Z field are data of FloatRange type. The last field of ColorspaceRange type is Colorspace field of anyURI type.

FIG. 10F illustrates a definition example of FloatRange type. In the definition of FloatRange type, complexType element indicates that the type is defined as a complex type. Also, sequence element indicates that the type is a data type in which data appears in the defined order.

In the FloatRange type, the first field is Min field of float type, and the last field is Max field of float type.

In this embodiment, the client apparatus 2000 acquires information of OSD that can be set in an image capturing apparatus of this embodiment, from the image capturing apparatus, by using the above-described data of OSDConfigurationOptions type. Also, the monitoring camera 1000 according to this embodiment uses the above-described data of OSDConfigurationOptions type for transmitting capability information relating to OSD in the monitoring camera 1000.

FIG. 11 shows an example configuration of a parameter of the image overlay setting of OSDConfigurationOptions type shown in FIG. 9A. In FIG. 11, MaximumNumberOfOSDs field is 3, Type field associated with OSDOptions field is image and text, and PositionOption field is only lower right.

A value associated with MaximumNumberOfOSDs field indicates the maximum number of OSD that can be set in the monitoring camera 1000. Also, a value associated with Type field corresponding to OSDOptions field indicates a type of OSD that can be used in the monitoring camera 1000. The type of OSD includes at least a text. Further, the type of OSD may include an image.

Further, a value associated with PositionOption field indicates the position at which the OSD image output from the OSD generating unit 1007 merged with (overlaid on) the captured image output from the image processing unit 1003. It is to be noted that LowerRight is an example of this value. Also, LowerLeft, UpperRight, UpperLeft, and Custom are other examples of this value.

In FIG. 11, TextOption is described. Type field associated with this TextOption field is plain text, date, or time. DateFormat field, which is a display format of date, is yyyy/MM/dd, and TimeFormat field, which is a display format of time, is HH:mm:ss.

That is, a value of Type field associated with TextOptions field indicates a type of OSD that can be used in the monitoring camera 1000. The date, time, and plain text are examples of this type. A value of DateFormat field associated with TextOptions field indicates a format of date that can be used in the monitoring camera 1000.

A value of TimeFormat field associated with TextOptions field indicates a format of time that can be used in the monitoring camera 1000.

Further, there are provided FontColor field and BackgroundColor field, which are setting of the font and background of the text. Transparent field of each is set in a setting range from 0 to 2. Accordingly, the transparency can be set for each of the font of the text and the background of the text.

Also, Color field is not defined in FontColor field or BackgroundColor field; however, the font is black and the background is white in FIG. 4 as typical setting. The details of ImageOption field are omitted.

The response in FIG. 11 according to this embodiment corresponds to transparency information indicative of whether or not the transparency can be set for each of the text and the background of the text of the OSD image.

Also, in this embodiment, Transparent field associated with FontColor field corresponds to information indicative of whether or not the transparency can be set for the text (first portion) of the OSD image.

For example, the response of GetOSDOptions indicates that the transparency cannot be set for the text of the OSD image if this Transparent field is omitted. Also, this Transparent field indicates that the transparency cannot be set for the text of the OSD image if values of Min field and Max field associated with this Transparent field are both 0.

Also, this Transparent field indicates that the transparency can be set for the text of the OSD image if values of Min field and Max field associated with this Transparent field are not the same. It is assumed that the value of Max filed is larger than the value of Min field, and is larger than 0.

Also, in this embodiment, Transparent field associated with BackgroundColor field corresponds to information indicative of whether or not the transparency can be set for the background of the text (second portion) of the OSD image.

For example, the response of GetOSDOptions indicates that the transparency cannot be set for the background of the text of the OSD image if this Transparent field is omitted. Also, this Transparent field indicates that the transparency cannot be set for the background of the text of the OSD image if values of Min field and Max field associated with this Transparent field are both 0.

Also, this Transparent field indicates that the transparency can be set for the background of the text of the OSD image if values of Min field and Max field associated with this Transparent field are not the same. It is assumed that the value of Max filed is larger than the value of Min field, and is larger than 0.

Also, in the response in FIG. 11 according to this embodiment, Transparent field is not associated with ImageOption field. Accordingly, in this response, the transparency cannot be set for the image stored in the location indicated by the information corresponding to ImagePath field.

Figure 12:
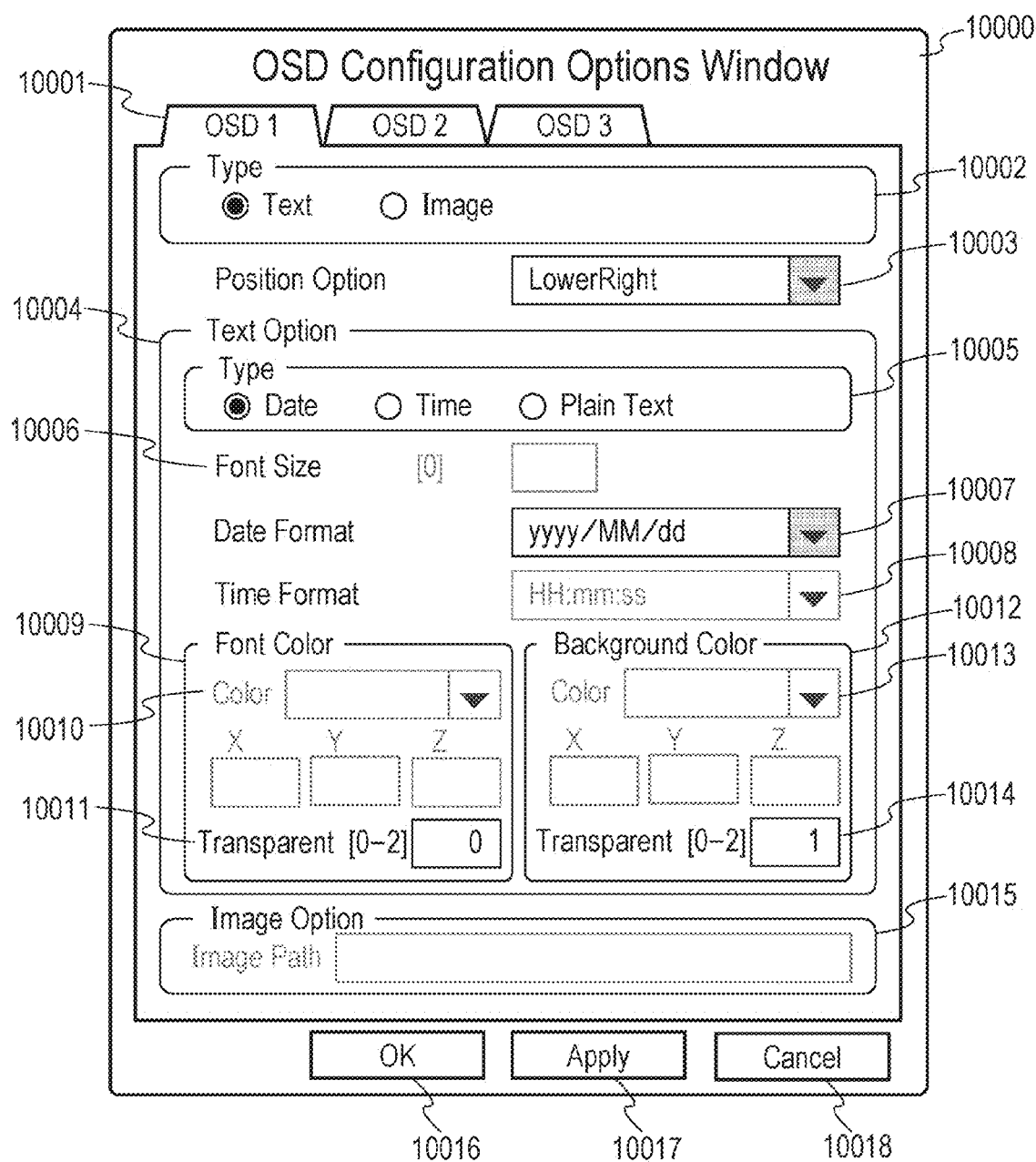
FIG. 12 is a display example of an overlaid image setting screen according to the first embodiment of the invention.

Then, FIG. 12 is a display example of an overlay image setting screen (that is, parameter setting screen of OSDConfigurationOptions) according to this embodiment. This display example is a display example when the client apparatus 2000 receives the response of GetOSDConfigurationOptions shown in FIG. 11. It is assumed that the screen shown in FIG. 12 is displayed on the display unit 2002.

In FIG. 12, reference sign 10000 is a setting window of OSDConfigurationOptions. When this setting window is created, the processing of the transactions from 6050 to 6054 in FIG. 7 is executed from the client apparatus 2000 to the monitoring camera 1000.

Reference sign 10001 in FIG. 12 is a tab for each OSD corresponding to MaximumNumberOfOSDs field shown in FIG. 11. Tabs 10001 are displayed by the number corresponding to the number of MaximumNumbersOfOSDs fields. For example, in FIG. 11, 3 is associated with MaximumNumberOfOSDs field. In this case, three tabs 10001 are displayed.

Reference sign 10002 is a radio button for selecting Type field. For example, in FIG. 11, Text and Image are associated with Type field. In this case, a user can select one of "Text" and "Image" by operating the radio button 10002.

Alternatively, only Text may be associated with Type filed in the parameter of the image overlay setting received by the client apparatus 2000. In this case, the user can select only "Text," but cannot select "Image" by operating the radio button 10002.

Similarly, only Image may be associated with Type field in the parameter of the image overlay setting. In this case, the user can select only "Image," but cannot select "Text" by operating the radio button 10002.

Also, reference sign 10003 is a drop-down list for setting PositionOption field. The drop-down list 10003 displays a value associated with PositionOption field in the parameter of the image overlay setting received by the client apparatus 2000.

For example, in FIG. 11, LowerRight is associated with PositionOption field. In this case, the drop-down list 10003 displays LowerRight.

Also, for example, the following values are associated with PositionOption field, in the parameter of the image overlay setting received by the client apparatus 2000. That is, the values are LowerRight, LowerLeft, UpperRight, UpperLeft, and Custom.

In this case, the drop-down list 10003 displays LowerRight, LowerLeft, UpperRight, UpperLeft, and Custom.

Reference sign 10004 is TextOption field. Further, reference sign 10005 is a radio button for selecting Type field of TextOption field. To be more specific, the radio button 10005 is for selecting one of values associated with Type field of TextOption field in the parameter of the image overlay setting received by the client apparatus 2000.

For example, in FIG. 11, Type filed corresponding to TextOption field is associated with Plain, Date, and Time. In this case, the user can select one of "Plain Text," "Date," and "Time" by operating the radio button 10005.

Reference sign 10006 is a text box for inputting a value corresponding to FontSize field. To be more specific, the text box 10006 is for inputting a value associated with FontSize field in the parameter of the image overlay setting received by the client apparatus 2000.

For example, in FIG. 11, FontSize field is omitted. In this case, in the text box 10006, the input range is zero, and the input is invalid. Hence, the user cannot input a value in the text box 10006 in the screen of FIG. 12.

Also, for example, a value may be associated with FontSize filed in the parameter of the image overlay setting received by the client apparatus 2000. In this case, an input can be made in the text box 10006. Hence, the user can input a value in the text box 10006 in the screen of FIG. 12.

Reference sign 10007 is a drop-down list for setting DateFormat field. The drop-down list 10007 displays a value associated with DateFormat field in the parameter of the image overlay setting received by the client apparatus 2000.

For example, in FIG. 11, yyyy/MM/dd is associated with DateFormat field. In this case, the drop-down list 10007 displays "yyyy/MM/dd."

Also, for example, yyyyMMdd or yyyy/MM/dd may be associated with DateFormat filed in the parameter of the image overlay setting received by the client apparatus 2000.

In this case, the drop-down list 10007 displays a list of "yyyyMMdd," or "yyyy/MM/dd."

Also, reference sign 10008 is a drop-down list for setting TimeFormat field. The drop-down list 10008 displays a value associated with TimeFormat field in the parameter of the image overlay setting received by the client apparatus 2000.

For example, in FIG. 11, HH:mm:ss is associated with TimeFormat field. In this case, the drop-down list 10008 displays "HH:mm:ss."

Reference sign 10009 is FontColor field. Reference sign 10010 is Color field for setting Color filed associated with FontColor field. The Color field 10010 includes a drop-down list, and three text boxes.

The drop-down list and three text boxes display a value of Color field associated with FontColor field, in the parameter of the image overlay setting received by the client apparatus 2000.

For example, in FIG. 11, Color field corresponding to FontColor field is omitted. In this case, an input is invalid in the drop-down list and three text boxes included in the Color field 10010. Hence, the user cannot input a value in any of the drop-down list and the three text boxes included in the Color field 10010 in the screen of FIG. 12.

Also, for example, a value may be associated with FontColor filed in the parameter of the image overlay setting received by the client apparatus 2000. In this case, an input can be made in the drop-down list and three text boxes included in the Color field 10010. Hence, the user can input a value in the drop-down list and three text boxes in the screen of FIG. 12.

Reference sign 10011 is a text box for inputting a value corresponding to Transparent field in FontColor field. To be more specific, the text box 10011 is for inputting a value corresponding to Transparent field associated with FontColor field in the parameter of the image overlay setting received by the client apparatus 2000.

For example, in FIG. 11, Min field with a value being "0" and Max field with a value being "2" are associated with Transparent field corresponding to FontColor field. In this case, the input range from 0 to 2 is displayed at the text box 10011. Further, the user can input a value in the text box 10011 in the screen of FIG. 12.

Reference sign 10012 is BackgroundColor field. Reference sign 10013 is Color field for setting Color filed associated with BackgroundColor field. The Color field 10013 includes a drop-down list, and three text boxes.

The drop-down list and three text boxes display a value of Color field associated with BackgroundColor field, in the parameter of the image overlay setting received by the client apparatus 2000.

For example, in FIG. 11, Color field corresponding to BackgroundColor field is omitted. In this case, an input is invalid in the drop-down list and three text boxes included in the Color field 10013. Hence, the user cannot input a value in any of the drop-down list and three text boxes included in the Color field 10013 in the screen of FIG. 12.

Also, for example, a value may be associated with BackgroundColor filed in the parameter of the image overlay setting received by the client apparatus 2000. In this case, an input can be made in the drop-down list and three text boxes included in the Color field 10013.

Hence, the user can input a value in the drop-down list and three text boxes in the screen of FIG. 12.

In FIG. 11, in Transparent field, since the Min value is 0 and the Max value is 2, the input range from 0 to 2 is displayed.

Reference sign 10014 is a text box for inputting a value corresponding to Transparent field in BackgroundColor field.

To be more specific, the text box 10014 is for inputting a value corresponding to Transparent field associated with BackgroundColor field, in the parameter of the image overlay setting received by the client apparatus 2000.

For example, in FIG. 11, Min field with a value being "0" and Max field with a value being "2" are associated with Transparent field corresponding to BackgroundColor field. In this case, the input range from 0 to 2 is displayed in the text box 10014. Further, the user can input a value in the text box 10014 in the screen of FIG. 12.

Reference sign 10015 is ImageOption field for inputting a value corresponding to ImageOption field. The ImageOption field 10015 includes a text box for inputting a value corresponding to ImagePath field associated with ImageOption field, in the parameter of the image overlay setting received by the client apparatus 2000.

For example, in FIG. 11, a value corresponding to ImagePath field associated with ImageOption field is omitted. In this case, an input is invalid in the text box included in the ImageOption field 10015. Hence, the user cannot input a value in ImageOption field in the screen of FIG. 12.

Also, for example, a value may be associated with ImagePath filed in the parameter of the image overlay setting received by the client apparatus 2000. In this case, an input can be made in the text box included in ImageOption field 10015. Hence, the user can input a value in the ImageOption field in the screen of FIG. 12.

In this embodiment, the user can input information indicative of the location where an image is stored, in ImagePath field. Also, this information corresponds to image information.

Reference sign 10016 is a setting button of OSDConfigurationOptions. If this setting button is pressed, the transaction 6057 for changing the image overlay setting from the client apparatus 2000 to the monitoring camera 1000 is processed, and the setting window is closed.

Reference sign 10017 is an apply button of OSDConfigurationOptions. If this apply button is pressed, the transaction 6057 for changing the image overlay setting from the client apparatus 2000 to the monitoring camera 1000 is processed, and the setting window is not closed.

Reference sign 10018 is a cancel button for setting change of OSDConfigurationOptions. If this cancel button is pressed, the transaction 6057 for changing the image overlay setting from the client apparatus 2000 to the monitoring camera 1000 is not executed, and the setting window is closed.

Figure 13:
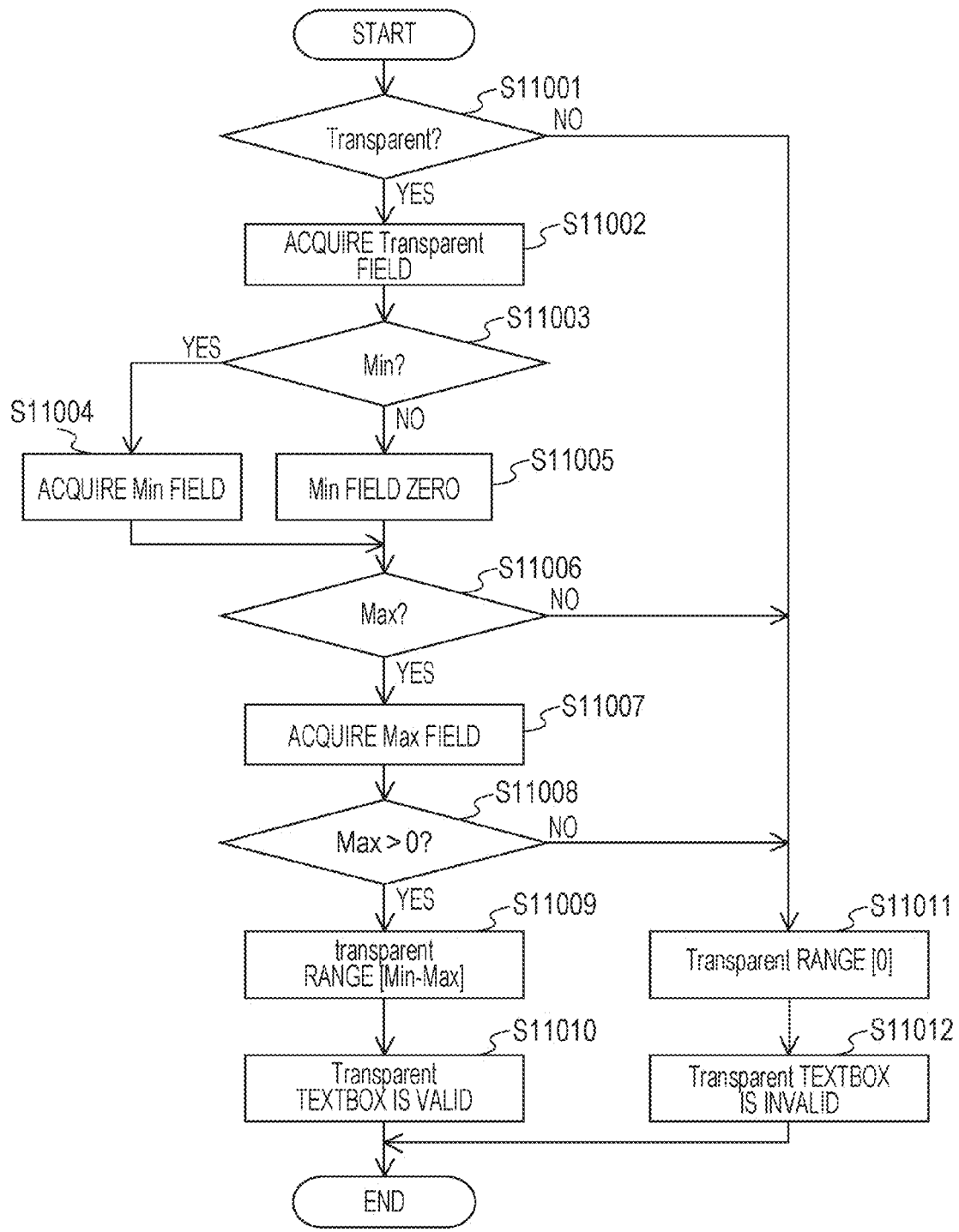
FIG. 13 is flowchart showing display processing of the overlaid image setting screen according to the first embodiment of the invention.

FIG. 13 is a flowchart showing display processing of the overlay image setting screen in the client apparatus 2000. That is, FIG. 13 is a flowchart of processing when the parameter of FontColor field acquired in the transaction 6054 for requesting acquisition of the image overlay setting is reflected on UI (user interface) of FIG. 12. This processing is executed by the control unit 2005.

In step S11001, the control unit 2005 determines whether or not Transparent field associated with FontColor is described in a response of GetOSDOptions received by the communication unit 2004. It is to be assumed that the response of GetOSDOptions received by the communication unit 2004 is stored in the storage unit 2006.

If the control unit 2005 determines that Transparent field associated with FontColor field is described in the response, the control unit 2005 advances the processing to step S11002. In contrast, if the control unit 2005 determines that Transparent field associated with FontColor field is not described in the response, the control unit 2005 advances the processing to step S11011.

In step S11002, the control unit 2005 acquires Transparent field associated with FontColor field in the response of GetOSDOptions received by the communication unit 2004. To be more specific, the control unit 2005 reads Transparent field associated with FontColor field in the response of GetOSDOptions received by the communication unit 2004, from the storage unit 2006.

In step S11003, the control unit 2005 determines whether or not Min field is included in Transparent field of FontColor field acquired in step S11002. If the control unit 2005 determines that Min field is included in Transparent field of FontColor field acquired in step S11002, the control unit 2005 advances the processing to step S11004.

In contrast, if the control unit 2005 determines that Min field is not included in Transparent field of FontColor field acquired in step S11002, the control unit 2005 advances the processing to step S11005.

In step S11004, the control unit 2005 acquires a Min value associated with Transparent field of FontColor field acquired in step S11002.

For example, the control unit 2005 reads a value corresponding to Min field associated with Transparent field of FontColor field acquired in step S11002, from the storage unit 2006. Then, the control unit 2005 causes the storage unit 2006 to store the read value as the Min value of Transparent of FontColor.

In step S11005, the control unit 2005 causes the storage unit 2006 to store "0" as the Min value of Transparent of FontColor.

In step S11006, the control unit 2005 determines whether or not Max field is included in Transparent field of FontColor field acquired in step S11002.

If the control unit 2005 determines that Max field is included in Transparent field of FontColor field acquired in step S11002, the control unit 2005 advances the processing to step S11007.

In contrast, if the control unit 2005 determines that Max field is not included in Transparent field of FontColor field acquired in step S11002, the control unit 2005 advances the processing to step S11011.

In step S11007, the control unit 2005 acquires a Max value of Transparent field of FontColor field acquired in step S11002.

For example, the control unit 2005 reads a value corresponding to Max field associated with Transparent field of FontColor field acquired in step S11002, from the storage unit 2006. Then, the control unit 2005 causes the storage unit 2006 to store the read value as the Max value of Transparent of FontColor.

In step S11008, the control unit 2005 determines whether or not the Max value associated with Transparent field of FontColor field acquired in step S11007 is larger than 0.

If the control unit 2005 determines that the Max value associated with Transparent field of FontColor field acquired in step S11007 is larger than 0, the control unit 2005 advances the processing to step S11009.

In contrast, if the control unit 2005 determines that the Max value associated with Transparent field of FontColor field acquired in step S11007 is not larger than 0, the control unit 2005 advances the processing to step S11011. Alternatively, the control unit 2005 may advance the processing to step S11011, instruct the communication unit 2004 about this, and transmit an error response to the client apparatus 2000.

In step S11009, the control unit 2005 causes the display unit 2002 to display the input range of 10011 in the screen of FIG. 12.

To be specific, the control unit 2005 reads the Min value of Transparent of FontColor from the storage unit 2006, and causes the display unit 2002 to display the read Min value as a minimum value of 10011 in FIG. 12. Also, the control unit 2005 reads the Max value of Transparent of FontColor from the storage unit 2006, and causes the display unit 2002 to display the read Max value as a maximum value of 10011 in FIG. 12.

In step S11010, the control unit 2005 causes the text box corresponding to 10011 in the screen of FIG. 12 to be valid. Hence, the user can input a value in the text box corresponding to 10011 in the screen of FIG. 12.

In step S11011, the control unit 2005 causes the display unit 2002 to display the input range of 10011 in the screen of FIG. 12. To be specific, the control unit 2005 causes the display unit 2002 to display 0 as the input range of 10011 in FIG. 12.

In step S11012, the control unit 2005 causes the text box corresponding to 10011 in the screen of FIG. 12 to be invalid. Hence, the user cannot input a value in the text box corresponding to 10011 in the screen of FIG. 12.

When a field other than Transparent field of FontColor among the fields in FIG. 11 is reflected on the screen of FIG. 12, a flowchart similar to the flowchart in FIG. 13 is applied.

For example, a case, in which Transparent field of BackgroundColor is reflected on UI of FIG. 12 together with Transparent field of FontColor, is described with reference to the flowchart in FIG. 13. In the following description, processing of reflecting Transparent field of FontColor on UI of FIG. 12 is omitted.

In step S11001, the control unit 2005 determines whether or not Transparent field associated with BackgroundColor field is described in the response of GetOSDOptions received by the communication unit 2004. It is to be assumed that the response of GetOSDOptions received by the communication unit 2004 is stored in the storage unit 2006.

If the control unit 2005 determines that Transparent field associated with BackgroundColor field is described in the response, the control unit 2005 advances the processing to step S11002.

In contrast, if the control unit 2005 determines that Transparent field associated with BackgroundColor field is not described in the response, the control unit 2005 advances the processing to step S11011.

In step S11002, the control unit 2005 acquires Transparent field associated with BackgroundColor field in the response of GetOSDOptions received by the communication unit 2004.

To be more specific, the control unit 2005 reads Transparent field associated with BackgroundColor field in the response of GetOSDOptions received by the communication unit 2004, from the storage unit 2006.

In step S11003, the control unit 2005 determines whether or not Min field is included in Transparent field of BackgroundColor field acquired in step S11002.

If the control unit 2005 determines that Min field is included in Transparent field of BackgroundColor field acquired in step S11002, the control unit 2005 advances the processing to step S11004.

In contrast, if the control unit 2005 determines that Min field is not included in Transparent field of BackgroundColor field acquired in step S11002, the control unit 2005 advances the processing to step S11005.

In step S11004, the control unit 2005 acquires a Min value associated with Transparent field of BackgroundColor field acquired in step S11002.

For example, the control unit 2005 reads a value corresponding to Min field associated with Transparent field of BackgroundColor field acquired in step S11002, from the storage unit 2006. Then, the control unit 2005 causes the storage unit 2006 to store the read value as the Min value of Transparent of BackgroundColor.

In step S11005, the control unit 2005 causes the storage unit 2006 to store "0" as the Min value of Transparent of BackgroundColor.

In step S11006, the control unit 2005 determines whether or not Max field is included in Transparent field of BackgroundColor field acquired in step S11002.

If the control unit 2005 determines that Max field is included in Transparent field of BackgroundColor field acquired in step S11002, the control unit 2005 advances the processing to step S11007.

In contrast, if the control unit 2005 determines that Max field is not included in Transparent field of BackgroundColor field acquired in step S11002, the control unit 2005 advances the processing to step S11011.

In step S11007, the control unit 2005 acquires a Max value associated with Transparent field of BackgroundColor field acquired in step S11002.

For example, the control unit 2005 reads a value corresponding to Max field associated with Transparent field of BackgroundColor field acquired in step S11002, from the storage unit 2006. Then, the control unit 2005 causes the storage unit 2006 to store the read value as the Max value of Transparent of BackgroundColor.

In step S11008, the control unit 2005 determines whether or not the Max value of Transparent of BackgroundColor acquired in step S11007 is larger than 0. If the control unit 2005 determines that the Max value of Transparent of BackgroundColor acquired in step S11007 is larger than 0, the control unit 2005 advances the processing to step S11009.

In contrast, if the control unit 2005 determines that the Max value of Transparent of BackgroundColor acquired in step S11007 is not larger than 0, the control unit 2005 advances the processing to step S11011. Alternatively, the control unit 2005 may advance the processing to step S11011, instruct the communication unit 2004 about this, and transmit an error response to the client apparatus 2000.

In step S11009, the control unit 2005 causes the display unit 2002 to display the input range of 10014 in the screen of FIG. 12.

To be specific, the control unit 2005 reads the Min value of Transparent of BackgroundColor from the storage unit 2006, and causes the display unit 2002 to display the read Min value as a minimum value of 10014 in FIG. 12. Also, the control unit 2005 reads the Max value of Transparent of BackgroundColor from the storage unit 2006, and causes the display unit 2002 to display the read Max value as a maximum value of 10014 in FIG. 12.

In step S11010, the control unit 2005 causes the text box corresponding to 10014 in the screen of FIG. 12 to be valid. Hence, the user can input a value in the text box corresponding to 10014 in the screen of FIG. 12.

In step S11011, the control unit 2005 causes the display unit 2002 to display the input range of 10014 in the screen of FIG. 12. To be specific, the control unit 2005 causes the display unit 2002 to display 0 as the input range of 10014 in FIG. 12.

In step S11012, the control unit 2005 causes the text box corresponding to 10014 in the screen of FIG. 12 to be invalid. Hence, the user cannot input a value in the text box corresponding to 10014 in the screen of FIG. 12.

As described above, in this embodiment, the monitoring camera 1000 transmits the response of GetOSDOptions command indicative of whether or not the transparency can be set for each of the text and the background of the text of the OSD image, to the client apparatus 2000.

Hence, the client apparatus 2000 can recognize whether or not the transparency can be set for each of the text and the background of the text included in the OSD image, which is overlaid by the monitoring camera 1000.

For example, a case is assumed in which a monitoring camera A that cannot set the transparency of the OSD image, a monitoring camera B that can set the transparency of the entire OSD image, and a monitoring camera C that can set the transparency of each of the text and the background of the text of the OSD image.

Even in this assumption, in the monitoring camera of this embodiment, the client apparatus 2000 can recognize which one of the monitoring cameras A to C can set the transparency for each of the text and the background of the text of the OSD image.

In this embodiment, the compressing and encoding unit 1004 is formed to merge the OSD image output from the OSD generating unit 1007 with the captured image output from the image processing unit 1003; however, it is not limited thereto. For example, the compressing and encoding unit 1004 may be formed to merge an image received from the client apparatus 2000 by the communication unit 1005 with the captured image output from the image processing unit 1003.

Also, in this embodiment, the screen of FIG. 12 is formed so that the radio button 10005 for selecting Type field of TextOption field in FIG. 11 is displayed. Further, the screen of FIG. 12 may be formed such that, if PlainText is selected by the radio button 10005, a text box for inputting a text corresponding to this PlainText is displayed.

Also, in this embodiment, the OSD image is described as an example of overlay information. However, the overlay information is not limited to the OSD image. For example, the overlay information may be a mask image. In this case, the mask image is an image to cause a certain portion of an object included in a captured image to be hardly viewed.

Also, in this embodiment, regarding the configuration of the parameter shown in FIG. 11, Min field with the value of "0" and Max field with the value of "2" are associated with Transparent field associated with FontColor field. This indicates that the value of Transparent field associated with Font-Color field is restricted to a predetermined range (0 to 2).

If the value of this Transparent field is the value of Min field associated with this Transparent field, the transparency of the text included in the OSD image becomes the lowest. As the value of this Transparent field becomes larger than the value of Min field, the transparency of the text included in the OSD image becomes higher.

Similarly, in this embodiment, regarding the configuration of the parameter shown in FIG. 11, Min field with the value of "0" and Max field with the value of "2" are associated with Transparent field associated with BackgroundColor field. This indicates that the value of Transparent field associated with BackgroundColor field is restricted to a predetermined range (0 to 2).

If the value of Transparent field is the value of Min field associated with Transparent field, the transparency of the background of the text included in the OSD image becomes the lowest. As the value of Transparent field becomes larger than the value of Min field, the transparency of the background of the text included in the OSD image becomes higher.

Also, in this embodiment, the parameter shown in FIG. 11 is configured such that Transparent field associated with FontColor field and Transparent field associated with BackgroundColor field may have the same range of values.

However, it is not limited thereto. For example, Transparent field associated with FontColor field and Transparent field associated with BackgroundColor field have different ranges of values.

Also, a dome cover formed in a semispherical shape may be added to the monitoring camera 1000 according to this embodiment. This dome cover is transparent, and is formed in a semispherical shape. Further, the dome cover covers the lens 1001 etc.

FIGS. 3A and 3B are the flowcharts for describing the merging processing of the captured image and the OSD image with the monitoring camera C that can set different transparencies of the text and the background of the text of the OSD image.

For example, processing of merging the captured image with the OSD image in the monitoring camera A that cannot set the transparency of the OSD image is described with reference to FIG. 3A. Steps S3001 to S3003 in the monitoring camera A are similar to steps S3001 to S3003 in the monitoring camera C, and hence the description is omitted.

In step S3004 in the monitoring camera A, the control unit 1008 instructs the OSD generating unit 1007 to generate an OSD image as bitmap data. The OSD image corresponds to the color etc. designated in the OSD setting information received in step S3001. However, the OSD image does not correspond to the transparency designated in the OSD setting information received in step S3001.

The control unit 1008 advances the processing to step S3005 without executing the OSD image generation processing in FIG. 3B. Step S3005 in the monitoring camera A is similar to step S3005 in the monitoring camera C, and hence the description is omitted.

For example, processing of merging the captured image with the OSD image in the monitoring camera B that can set the transparency of the entire OSD image is described with reference to FIG. 3A. Steps S3001 to S3005 in the monitoring camera B are similar to steps S3001 to S3005 in the monitoring camera C, and hence the description is omitted.

In step S3101 in the monitoring camera B, the control unit 1008 determines the transparency of the entire OSD image designated in the OSD setting information received in step S3001.

For example, in this embodiment, it is assumed that the transparency of the entire OSD image has three levels. Based on this assumption, the control unit 1008 advances the processing to step S3102 if the transparency of the entire OSD image designated in the OSD setting information received in step S3001 is 0. Also, the control unit 1008 advances the processing to step S3103 if the transparency of the entire OSD image designated in the OSD setting information received in step S3001 is 1.

The control unit 1008 advances the processing to step S3104 if the transparency of the entire OSD image designated in the OSD setting information received in step S3001 is 2.

In step S3102 in the monitoring camera B, the control unit 1008 instructs the OSD generating unit 1007 to generate this OSD image so that the entire OSD image is blended by 100% with the captured image by the compressing and encoding unit 1004. Accordingly, the captured image output form the image processing unit 1003 is not viewed in a transparent manner from beneath the entire generated OSD image.

In step S3103 in the monitoring camera B, the control unit 1008 instructs the OSD generating unit 1007 to generate this OSD image so that the entire OSD image is blended by 50% with the captured image by the compressing and encoding unit 1004. Accordingly, the captured image output form the image processing unit 1003 may be viewed in a transparent manner from beneath the entire generated OSD image.

In step S3104 in the monitoring camera B, the control unit 1008 instructs the OSD generating unit 1007 to generate this OSD image so that the entire OSD image is not blended with the captured image by the compressing and encoding unit 1004. Accordingly, the entire generated OSD image is not overlaid on the captured image output from the image processing unit 1003.

Then, after the control unit 1008 executes the processing in any one of steps S3102, S3103, and S3104, the control unit 1008 ends the OSD image generation processing in FIG. 3B without advancing the processing to step S3105.

Also, in this embodiment, in step S3101, the control unit 1008 is configured to advance the processing to step S3102 if the transparency of the font designated in the OSD setting information received in step S3001 is 0. Further, in step S3101, the control unit 1008 is configured to advance the processing to step S3103 if the transparency is 1, and advance the processing to step S3104 if the transparency is 2.

However, it is not limited thereto. For example, in step S3101, the control unit 1008 may be configured to advance the processing to step S3102 if the transparency is lower than 0.5, and advance the processing to step S3103 if the transparency is 0.5 or higher and lower than 1.5. Further, the control unit 1008 may be configured to advance the processing to step S3104 if the transparency is 1.5 or higher.

Also, in this embodiment, in step S3105, the control unit 1008 is configured to advance the processing to step S3106 if the transparency of the background designated in the OSD setting information received in step S3001 is 0. Further, in step S3105, the control unit 1008 is configured to advance the processing to step S3107 if the transparency is 1, and advance the processing to step S3108 if the transparency is 2.

However, it is not limited thereto. For example, in step S3105, the control unit 1008 may be configured to advance the processing to step S3106 if the transparency is lower than 0.5, and advance the processing to step S3107 if the transparency is 0.5 or higher and lower than 1.5. Further, the control unit 1008 may be configured to advance the processing to step S3108 if the transparency is 1.5 or higher.

Also, in this embodiment, FontColor field and BackgroundColor field are described in the responses of FIG. 11; however, it is not limited thereto.

For example, in the response in FIG. 11, ExtentionColor field corresponding to the data area 5005 in FIG. 5B may be described. This ExtentionColor field is for setting the transparency and color of the data area 5005.

Further, in the response in FIG. 11, Transparent field may be described in association with this ExtentionColor field. Further, Max field and Min field may be described in association with Transparent field. For example, the value of Max field may be 2, and also the value of Min field may be 2.

Further, in the response in FIG. 11, Transparent field may be described in association with this ExtentionColor field.

Also, in this embodiment, as described with reference to FIG. 5B, the outline is part of the background included in the OSD image; however, it is not limited thereto. For example, the outline may be handled separately from the text and the background of the text included in the OSD image.

For example, OutlineColor field may be described in the response in FIG. 11 so that the color and transparency can be set for the outline. For example, by describing Transparent field in association with this OutlineColor field, so that the transparency can be set for the outline.

Further, in the response in FIG. 11, Max field and Min field may be described in association with Transparent field. For example, the value of Min field may be 0, and the value of Max field may be 1. Also, by describing Color field in association with OutlineColor field, the color can be set for the outline.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-171645 filed Aug. 21, 2013, which is hereby incorporated by reference herein in its entirety.

What is claimed is:

1. An apparatus comprising:
   an image capturing section configured to capture an image of an object;
   an overlaying section configured to overlay overlay information on the captured image; and
   a transmitting section configured to transmit transparency information indicative of whether or not a transparency can be set for each of a first portion and a second portion of the overlay information to an external apparatus through a network.

2. The apparatus according to claim 1, wherein the transparency information indicates whether the transparency can be set for the first portion, the transparency can be set for the second portion, the transparency can be set for each of the first portion and the second portion, or the transparency cannot be set for the first portion or the second portion.

3. The apparatus according to claim 1, wherein, if the transparency information indicates that the transparency can be set for each of the first portion and the second portion, the transparency corresponding to the first portion and the transparency corresponding to the second portion are each restricted in a predetermined range.

4. The apparatus according to claim 1, wherein, if the transparency information indicates that the transparency can be set for each of the first portion and the second portion, a range of the transparency corresponding to the first portion and a range of the transparency corresponding to the second portion are different from each other.

5. The apparatus according to claim 1, wherein, if the transparency information indicates that the transparency can be set for each of the first portion and the second portion, the transparency information includes a range of the transparency corresponding to the first portion and a range of the transparency corresponding to the second portion.

6. The apparatus according to claim 5, further comprising:
a receiving section configured to receive the transparency set for the first portion, from an external apparatus via a network; and
a determining section configured to determine whether or not the transparency set for the received first portion is included in the range of the transparency corresponding to the transmitted first portion,
wherein, if the transparency is included, the transmitting section transmits information indicative of a normal state, and if the transparency is not included, the transmitting section transmits information indicative of an error state, to the external apparatus.

7. The apparatus according to claim 1, further comprising:
a receiving section configured to receive the transparency of the overlay information from an external apparatus via a network; and
a determining section configured to, if the transmitted transparency information indicates that the transparency cannot be set for the first portion or the second portion, determine whether or not the transparency for each of the first portion and the second portion has been received,
wherein, if the transparency for each of the first portion and the second portion has been received, the transmitting section transmits information indicative of an error state, to the external apparatus.

8. The apparatus according to claim 1,
wherein the first portion is a text, and
wherein the second portion is a background of the text.

9. The apparatus according to claim 8, wherein the text relates to a date on which the captured image was captured.

10. The apparatus according to claim 9, wherein the text relates to a time at which the captured image was captured.

11. The apparatus according to claim 9, wherein the text relates to the object, the image of which has been captured.

12. An external apparatus that can make communication with an apparatus via a network, the apparatus including an image capturing unit configured to capture an image of an object and an overlaying unit configured to overlay overlay information on the captured image, comprising:
an acquiring section configured to acquire transparency information indicative of whether or not a transparency can be set for each of a first portion and a second portion of the overlay information, which is overlaid, from the apparatus.

13. The external apparatus according to claim 12, further comprising:
a user interface section configured to, if the acquired transparency information indicates that the transparency can be set for each of the first portion and the second portion, input the transparency for each of the first portion and the second portion, and if the acquired transparency information does not indicate that the transparency can be set for each of the first portion and the second portion, be unable to input the transparency for each of the first portion and the second portion.

14. The external apparatus according to claim 12, further comprising:
a receiving section configured to receive overlay capability information indicative of whether or not the overlaying unit can overlay the overlay information on the captured image; and
a control section configured to, if the receiving section receives the overlay capability information indicative that the overlaying unit can overlay the overlay information on the captured image, control the acquiring section to acquire the transparency information.

15. A control method of an apparatus for communicating with an external apparatus via a network, comprising:
capturing an image of an object;
overlaying overlay information on the captured image; and
transmitting transparency information indicative of whether or not a transparency can be set for each of a first portion and a second portion of the overlay information to the external apparatus.

16. A non-transitory computer readable storage medium storing a computer executable program of instructions for causing a computer to perform a method for controlling an apparatus that communicates with an external apparatus via a network, the method comprising: capturing an image of an object; overlaying overlay information on the captured image; and transmitting transparency information indicative of whether or not a transparency can be set for each of a first portion and a second portion of the overlay information to the external apparatus.

17. An apparatus for communicating with an external apparatus via a network, comprising:
an image capturing section configured to capture an image of an object;
an overlaying section configured to overlay overlay information on the captured image; and
a transmitting section configured to, if the overlay information is first overlay information, transmit transparency information indicative that the transparency cannot be set, to the external apparatus, and if the overlay information is second overlay information, transmit transparency information indicative of whether or not the transparency can be set for each of a first portion and a second portion of the second overlay information, to the external apparatus.

18. The apparatus according to claim 17, wherein the first overlay information is an image corresponding to image information that is designated by the external apparatus.

19. The apparatus according to claim 17, further comprising:
a storage unit configured to store an image,
wherein the first overlay information is the image stored in the storage unit.

20. The apparatus according to claim 17, further comprising:
a receiving unit configured to receive an image,
wherein the first overlay information is the image received by the receiving unit.

21. The apparatus according to claim 17, wherein the second overlay information includes a text corresponding to text information that is designated by the external apparatus.

22. An external apparatus for communicating with an apparatus via a network, the apparatus including an image capturing unit configured to capture an image of an object and an overlaying unit configured to overlay overlay information on the captured image, comprising:
an acquiring section configured to, if the overlay information is first overlay information, acquire transparency information indicative that a transparency cannot be set, from the apparatus, and if the overlay information is second overlay information, acquire transparency information indicative of whether or not the transparency can be set for each of a first portion and a second portion of the second overlay information, from the apparatus.

23. A control method of an apparatus for communicating with an external apparatus via a network, comprising:
capturing an image of an object;
overlaying overlay information on the captured image; and
transmitting, if the overlay information is first overlay information, transparency information indicative that a transparency cannot be set, to the external apparatus, and if the overlay information is second overlay information, transmitting transparency information indicative of whether or not the transparency can be set for each of a first portion and a second portion of the second information, to the external apparatus.

24. A non-transitory computer readable storage medium storing a computer executable program of instructions for causing a computer to perform a method for controlling an apparatus for communicating with an external capturing an image of an object; overlaying overlay information on the captured image; and transmitting, if the overlay information is first overlay information, transparency information indicative that a transparency cannot be set, to the external apparatus; and if the overlay information is second overlay information, transmitting transparency information indicative of whether or not the transparency can be set for each of a first portion and a second portion of the second information, to the external apparatus.

* * * * *